(12) United States Patent
Green et al.

(10) Patent No.: US 9,092,149 B2
(45) Date of Patent: Jul. 28, 2015

(54) VIRTUALIZATION AND OFFLOAD READS AND WRITES

(75) Inventors: Dustin L. Green, Redmond, WA (US); Neal R. Christiansen, Bellevue, WA (US); Rajeev Nagar, Sammamish, WA (US); Malcolm James Smith, Bellevue, WA (US); Karan Mehra, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 752 days.

(21) Appl. No.: 12/938,383

(22) Filed: Nov. 3, 2010

(65) Prior Publication Data

US 2012/0110281 A1    May 3, 2012

(51) Int. Cl.
*G06F 12/00* (2006.01)
*G06F 3/06* (2006.01)
*G06F 12/08* (2006.01)
*G06F 9/455* (2006.01)
*G06F 21/62* (2013.01)

(52) U.S. Cl.
CPC .............. *G06F 3/062* (2013.01); *G06F 3/067* (2013.01); *G06F 3/0643* (2013.01); *G06F 3/0664* (2013.01); *G06F 9/45558* (2013.01); *G06F 12/0866* (2013.01); *G06F 21/62* (2013.01); *G06F 2009/45579* (2013.01)

(58) Field of Classification Search
CPC ..... G06F 3/062; G06F 3/0643; G06F 3/0664; G06F 3/067; G06F 12/0866
USPC .......................................................... 711/154
See application file for complete search history.

(56) References Cited

U.S. PATENT DOCUMENTS

| | | | |
|---|---|---|---|
| 5,043,866 A | 8/1991 | Myre, Jr. et al. | |
| 5,355,477 A * | 10/1994 | Strickland et al. | 707/690 |
| 5,528,594 A | 6/1996 | Butter et al. | |
| 5,668,958 A | 9/1997 | Bendert et al. | |
| 5,678,021 A | 10/1997 | Pawate et al. | |
| 6,141,705 A | 10/2000 | Anand et al. | |
| 6,161,145 A * | 12/2000 | Bainbridge et al. | 709/246 |
| 6,275,867 B1 | 8/2001 | Bendert et al. | |
| 6,304,983 B1 | 10/2001 | Lee et al. | |
| 6,385,701 B1 | 5/2002 | Krein et al. | |

(Continued)

FOREIGN PATENT DOCUMENTS

| | | |
|---|---|---|
| CN | 100343793 C | 10/2007 |
| CN | 101278270 A | 10/2008 |

(Continued)

OTHER PUBLICATIONS

Bandulet, Christian, "Object-Based Storage Devices", Retrieved at <<http://developers.sun.com/solaris/articles/osd.html>> Jul. 2007, p. 7.

(Continued)

*Primary Examiner* — Aracelis Ruiz
(74) *Attorney, Agent, or Firm* — John Jardine; Kate Drakos; Micky Minhas

(57) ABSTRACT

Aspects of the subject matter described herein relate to virtualization and offload reads and writes. In aspects, an offload read allows a requestor to obtain a token that represents data while an offload write allows the requestor to request that the data (or a part thereof) represented by a token be logically written. Offload reads and writes may be used to perform various actions for virtual environments.

20 Claims, 18 Drawing Sheets

(56) References Cited

U.S. PATENT DOCUMENTS

| | | |
|---|---|---|
| 6,434,620 B1 | 8/2002 | Boucher et al. |
| 6,697,881 B2 | 2/2004 | Cochran |
| 6,785,743 B1 | 8/2004 | Sun et al. |
| 7,016,982 B2 | 3/2006 | Basham |
| 7,107,385 B2 | 9/2006 | Rajan et al. |
| 7,275,139 B1 | 9/2007 | Tormasov et al. |
| 7,373,548 B2 | 5/2008 | Reinhardt et al. |
| 7,383,405 B2 | 6/2008 | Vega et al. |
| 7,406,501 B2 | 7/2008 | Szeto et al. |
| 7,475,167 B2 | 1/2009 | Wunderlich et al. |
| 7,475,199 B1 | 1/2009 | Bobbitt |
| 7,565,526 B1 | 7/2009 | Shaw et al. |
| 7,567,985 B1 | 7/2009 | Comay et al. |
| 7,613,786 B2 | 11/2009 | Nakamura et al. |
| 7,633,955 B1 | 12/2009 | Saraiya et al. |
| 7,676,607 B2 | 3/2010 | Jung et al. |
| 7,694,105 B2 | 4/2010 | Sanvido |
| 7,730,034 B1 | 6/2010 | Deflaux et al. |
| 7,730,231 B2 | 6/2010 | Weisser et al. |
| 7,801,852 B2 | 9/2010 | Wong et al. |
| 7,804,862 B1 | 9/2010 | Olson et al. |
| 7,814,058 B2 | 10/2010 | Beck |
| 7,831,720 B1 | 11/2010 | Noureddine et al. |
| 7,886,115 B2 | 2/2011 | Sanvido et al. |
| 7,890,717 B2 | 2/2011 | Tsuboki et al. |
| 7,895,445 B1 | 2/2011 | Albanese |
| 8,042,163 B1 | 10/2011 | Karr et al. |
| 8,082,231 B1 | 12/2011 | McDaniel et al. |
| 8,086,585 B1 | 12/2011 | Brashers et al. |
| 8,213,583 B2 | 7/2012 | Finogenov |
| 8,239,674 B2 | 8/2012 | Lee et al. |
| 8,250,267 B2 | 8/2012 | Logan |
| 8,261,005 B2 | 9/2012 | Flynn et al. |
| 8,261,267 B2 | 9/2012 | Iwamatsu et al. |
| 8,332,370 B2 | 12/2012 | Gattegno et al. |
| 2002/0019788 A1 | 2/2002 | Stehle et al. |
| 2002/0038296 A1 | 3/2002 | Margolus et al. |
| 2002/0178335 A1 | 11/2002 | Selkirk et al. |
| 2002/0198788 A1 | 12/2002 | Moskowitz et al. |
| 2003/0058238 A1 | 3/2003 | Doak et al. |
| 2004/0049603 A1 | 3/2004 | Boyd et al. |
| 2004/0153451 A1 | 8/2004 | Phillips et al. |
| 2004/0205202 A1 | 10/2004 | Nakamura et al. |
| 2004/0267672 A1 | 12/2004 | Gray et al. |
| 2005/0131875 A1 | 6/2005 | Riccardi et al. |
| 2006/0218544 A1 | 9/2006 | Chakraborty et al. |
| 2006/0230222 A1* | 10/2006 | Yamagami ............ 711/4 |
| 2006/0294234 A1 | 12/2006 | Bakke et al. |
| 2007/0055702 A1 | 3/2007 | Fridella et al. |
| 2007/0260831 A1 | 11/2007 | Michael et al. |
| 2008/0065835 A1 | 3/2008 | Iacobovici et al. |
| 2008/0104039 A1 | 5/2008 | Lowson |
| 2008/0120470 A1 | 5/2008 | Dhamankar et al. |
| 2008/0128484 A1 | 6/2008 | Spaeth et al. |
| 2008/0140910 A1 | 6/2008 | Flynn et al. |
| 2008/0147755 A1 | 6/2008 | Chapman |
| 2008/0155051 A1 | 6/2008 | Moshayedi |
| 2008/0155223 A1 | 6/2008 | Hiltgen et al. |
| 2008/0184273 A1 | 7/2008 | Sekar |
| 2008/0235479 A1 | 9/2008 | Scales et al. |
| 2008/0282337 A1 | 11/2008 | Crawford |
| 2009/0172665 A1 | 7/2009 | Tene et al. |
| 2009/0198731 A1 | 8/2009 | Noonan, III |
| 2009/0248835 A1 | 10/2009 | Panda et al. |
| 2009/0249001 A1 | 10/2009 | Narayanan et al. |
| 2009/0282101 A1 | 11/2009 | Lim et al. |
| 2009/0300301 A1 | 12/2009 | Vaghani |
| 2009/0327621 A1* | 12/2009 | Kliot et al. ............ 711/154 |
| 2010/0042796 A1 | 2/2010 | Vasilevsky et al. |
| 2010/0070725 A1 | 3/2010 | Prahlad et al. |
| 2010/0083276 A1 | 4/2010 | Green et al. |
| 2010/0094806 A1 | 4/2010 | Apostolides et al. |
| 2010/0115184 A1 | 5/2010 | Chang |
| 2010/0115208 A1 | 5/2010 | Logan |
| 2010/0122248 A1 | 5/2010 | Robinson et al. |
| 2010/0146190 A1 | 6/2010 | Chang |
| 2010/0228913 A1 | 9/2010 | Czezatke et al. |
| 2010/0235831 A1 | 9/2010 | Dittmer |
| 2010/0241785 A1 | 9/2010 | Chen et al. |
| 2010/0250630 A1 | 9/2010 | Kudo |
| 2010/0306467 A1 | 12/2010 | Pruthi et al. |
| 2010/0325441 A1 | 12/2010 | Laurie et al. |
| 2011/0055406 A1 | 3/2011 | Piper et al. |
| 2011/0072059 A1 | 3/2011 | Guarraci |
| 2011/0075557 A1 | 3/2011 | Chowdhury et al. |
| 2011/0197022 A1 | 8/2011 | Green et al. |
| 2011/0214172 A1 | 9/2011 | Hermann et al. |
| 2012/0079229 A1* | 3/2012 | Jensen et al. ............ 711/170 |
| 2012/0079583 A1 | 3/2012 | Christiansen et al. |
| 2012/0144501 A1 | 6/2012 | Vangpat et al. |
| 2012/0233434 A1 | 9/2012 | Starks et al. |
| 2012/0233682 A1 | 9/2012 | Finogenov |
| 2012/0324560 A1 | 12/2012 | Matthew et al. |
| 2013/0041985 A1 | 2/2013 | Christiansen et al. |
| 2013/0179649 A1 | 7/2013 | Green et al. |
| 2013/0179959 A1 | 7/2013 | Green et al. |
| 2014/0164571 A1 | 6/2014 | Green |
| 2014/0172811 A1 | 6/2014 | Green |

FOREIGN PATENT DOCUMENTS

| | | |
|---|---|---|
| CN | 101622596 A | 1/2010 |
| EP | 2262164 A1 | 12/2010 |
| JP | 2010-033206 | 2/2010 |
| WO | WO 2009/146001 | 12/2009 |
| WO | WO 2012/039939 | 3/2012 |

OTHER PUBLICATIONS

"Saving and Restoring ZFS Data", Retrieved at <<http://docs.huihoo.com/opensolaris/solaris-zfs-administration-guide/html/ch06s03.html>> Jun. 13, 2008, p. 3.

Narayanan, et al., "Write Off-Loading: Practical Power Management for Enterprise Storage", Retrieved at <<http://research.microsoft.com/en-us/um/people/antr/MS/fast08.pdf>> Feb. 2008, p. 15.

"Disk cache infrastructure enhancements", Retrieved at <<http://publib.boulder.ibm.com/infocenter/wasinfo/v6r1/index.jsp?topic=/com.ibm.websphere.express.doc/info/exp/ae/cdyn_diskcacheenhance.html>>, Jun. 15, 2010, p. 2.

"Automated, Integrated, and Scalable Protection of Virtual Machines", Retrieved at <<http://www.dell.com/downloads/global/products/pvaul/en/equallogic_ps_vmware_asmve_specsheet.pdf>> Retrieved Date: Jul. 26, 2010, pp. 2.

PCT Preliminary Report on Patentability, mailed Mar. 26, 2013, in Application PCT/US2011/050739, 6 pgs.

Dean, Randall W. et al., "Data Movement in Kernelized Systems", Retrieved at << http://citeseerx.ist.psu.edu/viewdoc/download?3doi=10.1.1.56.4419&rep=rep1 &type=pdf >>, Proceedings of the Workshop on Micro-kernels and Other Kernel Architectures, 1992, 22 pgs.

Devulapalli, et al., "Design of an Intelligent Object-based Storage device", Retrieved at << http://www.osc.edu/ research/network_file/projects/object/papers/istor-tr.pdf>>, retrieved date: Jul. 5, 2010, 12 pgs.

International Search Report, Mailed Date: Apr. 9, 2012, Application No. PCT/US2011/050739, Filed Date: Sep. 7, 2011, 9 pages.

Lachaize, Renaud et al., "A Distributed Shared Buffer Space for Data-intensive Applications", Retrieved at<< http://1 ieeexplore.ieee.org/stamp/stamp.jsp?tp=&arnumber=1558659 >>, Proceedings of the Fifth IEEE International Symposium on Cluster Computing and the Grid, vol. 2, 2005, pp. 913-920.

U.S. Appl. No. 12/888,433, Office Action mailed Nov. 27, 2012, 13 pgs.

Wang, Cheng et al., "A Computation Offloading Scheme on Handheld Devices", Retrieved at << http://citeseerx.ist.psu.edu/2viewdoc/download?doi=10.1.1.66.9721 &rep=rep1 &type=pdf >>, Journal of Parallel and Distributed Computing, vol. 64, No. 6, Jun. 2004, pp. 740-746.

What pv technology means in vSphere, Retrieved at<< http://www.lusovirt.com/wordpress/?p=5 >>, Jan. 30, 2010, 7 pgs.

(56) References Cited

OTHER PUBLICATIONS

U.S. Appl. No. 12/888,433, Amendment and Response filed Feb. 27, 2013, 12 pgs.
U.S. Appl. No. 12/888,433, Office Action mailed May 8, 2013, 14 pgs.
European Official Communication in Application 11827196.4, mailed May 2, 2013, 2 pgs.
Agarwal, "Distributed Checkpointing of Virtual Machines In Xen Framework", Thesis Submitted In Partial Fulfillment of The Requirements for the Degree of Master of Technology in Computer Science and Engineering, Department of Computer Science and Engineering, Indian Institute of Technology, Kharagpur, May 2008, 1-44.
Campbell, Lisa, "Hyper-V Scalability Evident in Its New Virtual Disk Format", Published on: Jul. 9, 2012, Available at: http://www.unitrends.com/hyper-v-backup/hyper-vscalability-evident-virtual-disk-format/.
ControlSphere Token data structure, Retrieved at <<http://www.securesystems.lv/HelpSystemITokenDataManager.htm>>, Retrieved Date: Nov. 18, 2011, pp. 10.
Deploying Virtual Hard Disk Images, www.technet.microsoft.com-en-us-librarydd363560(WS.1O,printer).aspx, accessed Dec. 8, 2010, 1-8.
Elnozahy et al., "The performance of Consistent Checkpointing", 11th Symposium on Reliable Distributed Systems, Houston, TX, USA, Oct. 5-7, 1992, 39-47.
Eshel et al. "Panache: A Parallel File System Cache for Global File Access", Feb. 2010, 14 pages.
FSCTL_FILE_LEVEL_ TRIM Control Code, Retrieved on: Jul. 11, 2012, Available at: http://msdn.microsoft.com/en-us/library/windows/hardware/hh451 098(v=vs.85).aspx.
How to Resize a Microsoft Virtual Hard Drive (VHD), http:—sysadmingeek.com-articleshow-to-resize-a-microsoft-virtual-hard-drive-vhd-file-, accessed Jan. 24, 2011, 1-10.
International Patent Application No. PCT/US2011/055586, International Search Report dated May 31, 2012, 8 pages.
International Patent Application No. PCT/US2011/055591, International Search Report dated May 31, 2012, 8 pages.
International Patent Application No. PCT/US2012/027645: International Search Report and Written Opinion dated Sep. 25, 2012, 9 pages.
Jarvinen et al., "Embedded SFE: Offloading Server and Network Using Hardware Tokens", Jan. 2010, 21 pgs.
Kerr, "The Virtual Disk API In Windows 7", http:—msdn.microsoft.com-en-us-magazinedd569754.aspx, accessed Feb. 23, 2011, 1-7.
Leser, Towards a Worldwide Distributed File System, Sep. 27, 1990, 13 pages.
PCT International Search Report and Written Opinion in Application PCT/US2012/047261, mailed Jan. 31, 2013, 8 pgs.
Storage_Offload_Token structure, Retrieved at <<http://msdn.microsofl.com/en-us/library/windows/hardware/hh451469%28v=vs.85%29.aspx>>, Retrieved Date: Sep. 7, 2011, 2 Pages.
TRIM/UNMAP Support in Windows Server 2012 & Hyper-VNHDX, Published on: May 23, 2012, Available at: http://workinghardinit.wordpress.com/20 12/05/23/trimunmap-support-inwindows-serve r -20 12-hyper -vvhdx/.
Troubleshooting Parent Virtual Disk Errors in Fusion, http:—kb.vmware.com-selfservicemicrosites-search.do?language= en_US&cmd=displayKC&externalld=1018832, accessed Feb. 23, 2011, 1-7.
U.S. Appl. No. 12/888,433, Amendment and Response filed Aug. 8, 2013, 12 pgs.
U.S. Appl. No. 13/207,014, Office Action mailed Jun. 24, 2013, 15 pgs.
U.S. Appl. No. 13/343,718, Office Action mailed May 30, 2013, 16 pgs.
Using Differencing Disks, www.technet.microsoft.com-en-us-library-cc720381(WS.1O,printer).aspx, accessed Dec. 8, 2010, 1-3.
Virtual Hard Disk Image Format Specification, Microsoft Corporation, Oct. 11, 2006, 1-8.
VMWare Recovering Vmware Snapshot after Parent Changed, http:—itit-larsen.dkindex.php?option=com_content&view=article&id=6:vmware-recovering-vmware-snapshotafter-parent-changed&catid=1 :vmware-35&Itemid=4, accessed Feb. 23, 2011, 1-3.
Wang, et al., "Cooperative Cache Management in S2FS", Retrieved at <<http://citeseerx.isl.psu.edu/viewdoc/ download?doi=10.1.1.35.4829&rep=rep1&type=pdf>>, In Proceedings of PDPTA, May 10, 1999, pp. 7.
Yang et al., "Windows Server 2008", Virtual Hard Disk Performance, A Microsoft White Paper, Mar. 2010, 1-35.
European Official Communication in Application 12756990.3, mailed Oct. 18, 2013, 2 pgs.
U.S. Appl. No. 13/343,718, Amendment and Response filed Sep. 30, 2013, 12 pgs.
U.S. Appl. No. 13/343,718, Office Action mailed Nov. 25, 2013, 17 pgs.
U.S. Appl. No. 13/345,753, Office Action mailed Nov. 7, 2013, 24 pgs.
FSCTL_FILE_LEVEL_ TRIM Control Code, Retrieved on: Jul. 11, 2012, Available at: http://msdn.microsoft.com/en-us/library/windows/hardware/hh451098(v=vs.85).aspx.
Microsoft, "Offloaded Data Transfer (ODX) with Intelligent Storage Arrays", Feb. 28, 2012, 14 pgs.
TRIM/UNMAP Support in Windows Server 2012 & Hyper-VNHDX, Published on: May 23, 2012, Available at: http://workinghardinit.wordpress.com/20 12/05/23/trimunmap-support-inwindows-server2012-hyper-vvhdx/, 4 pgs.
U.S. Appl. No. 13/046,617, Office Action mailed Aug. 19, 2013, 6 pgs.
U.S. Appl. No. 13/207,014, Amendment and Response filed Sep. 24, 2013, 10 pgs.
Wang, et al., "Cooperative Cache Management in S2FS", Retrieved at <<http://citeseerx.isl.psu.edu/viewdoc/ download?doi=10.1.1.35.4829&rep=rep1&type=pdf, in Proceedings of PDPTA, May 10, 1999, pp. 7.
"Compatible Extending Offload Token Size", U.S. Appl. No. 13/714,413, filed Dec. 14, 2012, 69 pgs. (MS # 337954.01).
"Copy Offload for Disparate Offload Providers", U.S. Appl. No. 13/711,637, filed Dec. 12, 2012, 70 pgs. (MS # 337621.01).
U.S. Appl. No. 13/046,617, Amendment and Response filed Jan. 21, 2014, 10 pgs.
U.S. Appl. No. 13/162,592, Office Action mailed Dec. 4, 2013, 15 pgs.
U.S. Appl. No. 13/207,014, Office Action mailed Jan. 16, 2014, 16 pgs.
WIKIPEDIA, Universally Unique Identifier (UUID), located online at: http://en.wikipedia.org/wiki/Universally_unique_identifier, on Nov. 27, 2013, 2 pgs.
Wu et al., "Distributed Runtime Load-Balancing for Software Routers on Homogeneous Many-Core Processors", retrieved at: http://conferences.sigcomm.org/co-next/2010/Workshops/PRESTO_papers/01-Wu.pdf, Proc. Of the ACM context workshop on programmable routers for extensible services of tomorrow (PRESTO), Nov. 30, 2011, 6 pgs.
U.S. Appl. No. 13/162,592, Amendment and response filed Apr. 4, 2014, 12 pgs.
U.S. Appl. No. 12/888,433, Office Action mailed Mar. 28, 2014, 15 pgs.
U.S. Appl. No. 13/343,718, Amendment and Response filed Feb. 25, 2014, 12 pgs.
U.S. Appl. No. 13/345,753, Amendment and Response filed Feb. 7, 2014, 14 pgs.
U.S. Appl. No. 13/343,718, Office Action mailed Mar. 20, 2014, 20 pgs.
Chinese 1st Office Action in Application 201110343154.7, mailed Jan. 22, 2014, 10 pgs.
Chinese 1st Office Action in Application 201110285468.6, mailed Jan. 30, 2014, 16 pgs.
Australian Office Action in Application 2011305839, mailed Apr. 4, 2014, 3 pgs.
PCT International Search Report in International Application PCT/US2013/074509, mailed Mar. 28, 2014, 12 pgs.

(56) References Cited

OTHER PUBLICATIONS

PCT International Search Report in International Application PCT/US2013/075212, mailed Apr. 25, 2014, 10 pgs.
U.S. Appl. No. 13/207,014, Amendment and Response filed Apr. 16, 2014, 14 pgs.
U.S. Appl. No. 13/345,753, Office Action mailed Apr. 25, 2014, 24 pgs.
U.S. Appl. No. 13/162,592, Office Action mailed May 28, 2014, 15 pgs.
Walla, "Kerberos Explained", Windows 2000 Advantage magazine, Microsoft Technet, May 2000, 6 pgs.
U.S. Appl. No. 13/711,637, Office Action mailed Sep. 23, 2014, 6 pgs.
U.S. Appl. No. 13/714,413, Amendment and Response filed Oct. 9, 2014, 11 pgs.
U.S. Appl. No. 13/345,753, Amendment and Response filed Jul. 25, 2014, 14 pgs.
U.S. Appl. No. 13/714,413. Office Action mailed Aug. 13, 2014, 12 pgs.
Australian Office Action in Application 2011305839, mailed Jul. 2, 2014, 4 pgs.
European Communication and EESR in Application 12756990.3, mailed Jul. 18, 2014, 8 pgs.
European Communication in Application 12756990.3, mailed Aug. 5, 2014, 1 page.
U.S. Appl. No. 13/162,592, Amendment and response filed Oct. 28, 2014, 12 pgs.
U.S. Appl. No. 13/345,753, Office Action mailed Oct. 31, 2014, 26 pgs.
U.S. Appl. No. 13/711,637, Amendment and Response filed Oct. 14, 2014, 8 pgs.
U.S. Appl. No. 13/711,637, Notice of Allowance mailed Nov. 3, 2014, 8 pgs.
Chinese 2nd Office Action in Application 201110343154.7, mailed Sep. 23, 2014, 18 pgs.
Chinese 2nd Office Action in Application 201110285468.6, mailed Sep. 30, 2014, 22 pgs.
U.S. Appl. No. 13/046,617, Office Action mailed Nov. 20, 2014, 7 pgs.
U.S. Appl. No. 13/714,413, Office Action mailed Dec. 15, 2014, 9 pgs.
U.S. Appl. No. 13/162,592, Office Action mailed Jan. 27, 2015, 13 pgs.
U.S. Appl. No. 13/345,753, Amendment and Response filed Jan. 29, 2015, 14 pgs.
PCT Written Opinion in International Application PCT/US2013/075212, mailed Oct. 22, 2014, 6 pgs.
U.S. Appl. No. 13/207,014, Office Action mailed Mar. 5, 2015, 19 pgs.
U.S. Appl. No. 13/711,637, Notice of Allowance mailed Mar. 3, 2015, 8 pgs.
U.S. Appl. No. 13/714,413, Amendment and Response filed Feb. 20, 2015, 14 pgs.
U.S. Appl. No. 13/162,592, Amendment and response filed Apr. 27, 2015, 12 pgs.
U.S. Appl. No. 13/345,753, Office Action mailed Apr. 30, 2015, 28 pgs.
European Supplementary Search Report in Application 12821531.6, mailed Feb. 13, 2015, 7 pgs.
European Communication in Application 12821531.6, mailed Mar. 3, 2015, 1 page.
Chinese 3rd Office Action in Application 201110343154.7, mailed Mar. 24, 2015, 7 pgs.
U.S. Appl. No. 13/046,617, Amendment and Response filed May 8, 2015, 9 pgs.
U.S. Appl. No. 13/046,617, Notice of Allowance mailed May 22, 2015, 7 pgs.
U.S. Appl. No. 13/714,413, Notice of Allowance mailed Jun. 3, 2015, 13 pgs.
Czap, Laszlo et al., Secure Key Exchange in Wireless Networks, 2011, IEEE, 6 pages.

\* cited by examiner

VIRTUALIZATION AND OFFLOAD READS AND WRITES

BACKGROUND

One mechanism for transferring data is to read the data from a file of a source location into main memory and write the data from the main memory to a destination location. While in some environments, this may work acceptably for relatively little data, as the data increases, the time it takes to read the data and transfer the data to another location increases. In addition, if the data is accessed over a network, the network may impose additional delays in transferring the data from the source location to the destination location. Furthermore, security issues combined with the complexity of storage arrangements may complicate data transfer.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to virtualization and offload reads and writes. In aspects, an offload read allows a requestor to obtain a token that represents data while an offload write allows the requestor to request that the data (or a part thereof) represented by a token be logically written. Offload reads and writes may be used to perform various actions for virtual environments.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

As used herein, terms such as "a," "an," and "the" are inclusive of one or more of the indicated item or action. In particular, in the claims a reference to an item generally means at least one such item is present and a reference to an action means at least one instance of the action is performed.

Headings are for convenience only; information on a given topic may be found outside the section whose heading indicates that topic.

Sometimes herein the terms "first", "second", "third" and so forth are used. The use of these terms, particularly in the claims, is not intended to imply an ordering but is rather used for identification purposes. For example, the phrase "first data" and "second data" does not necessarily mean that the first data is located physically or logically before the second data or even that the first data is requested or operated on before the second data. Rather, these phrases are used to identify sets of data that are possibly distinct or non-distinct. That is, first data and second data may refer to different data, the same data, some of the same data and some different data, or the like. The first data may be a subset, potentially a proper subset, of the second data or vice versa.

Note, although the phrases "data of the store" and "data in the store" are sometimes used herein, there is no intention in using these phrases to limit the data mentioned to data that is physically stored on a store. Rather these phrases are meant to limit the data to data that is logically in the store even if the data is not physically in the store. For example, a storage abstraction (described below) may perform an optimization wherein chunks of zeroes (or other data values) are not actually stored on the underlying storage media but are rather represented by shortened data (e.g., a value and length) that represents the zeros. Other examples are provided below.

Exemplary Operating Environment

Figure 1:
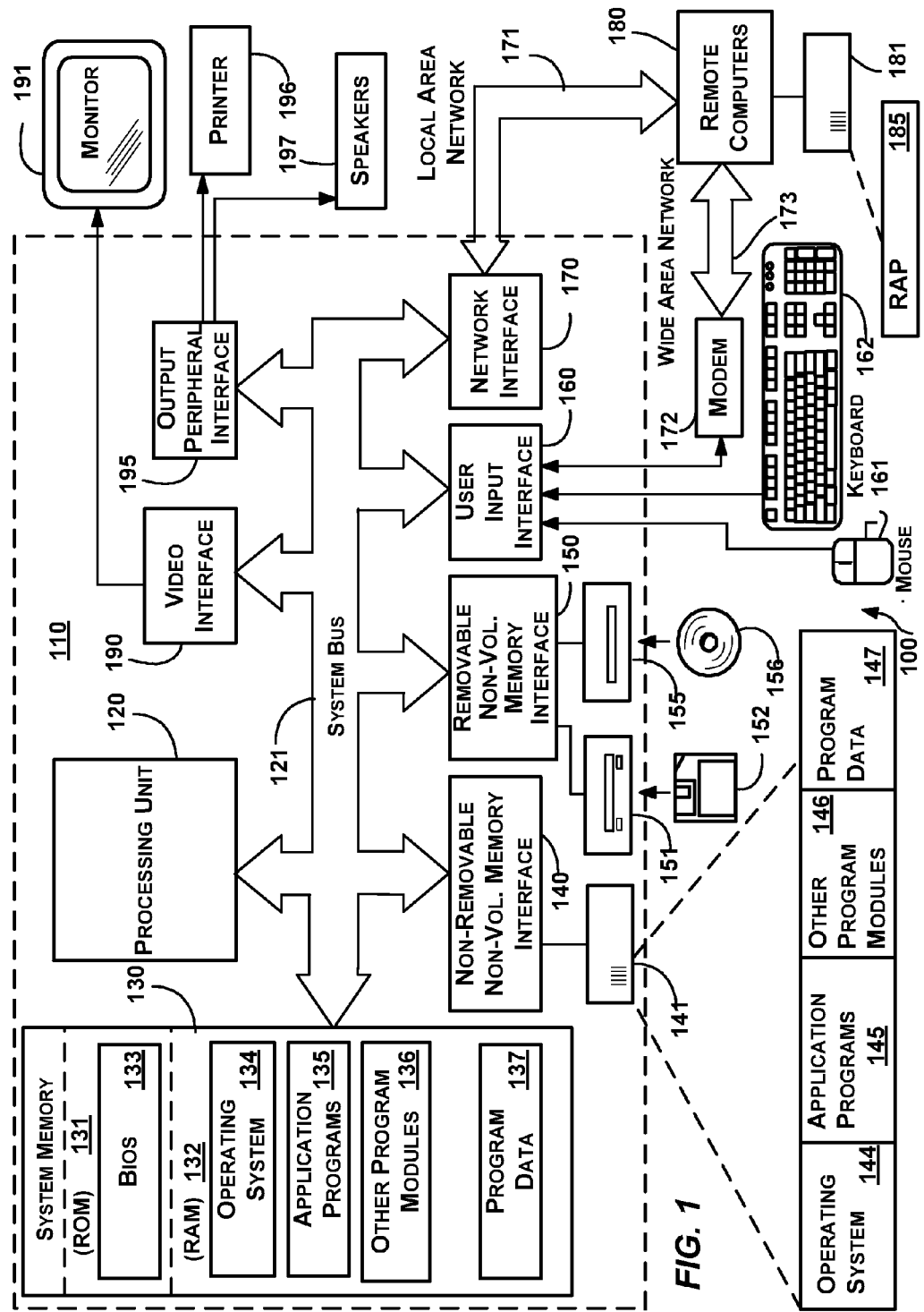
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers from their corresponding counterparts in the RAM 132 to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Offload Reads and Writes

As mentioned previously, some traditional data transfer operations may not be efficient or even work in today's storage environments.

FIGS. 2-5 are block diagrams that represent exemplary arrangements of components of systems in which aspects of the subject matter described herein may operate. The components illustrated in FIGS. 2-5 are exemplary and are not meant to be all-inclusive of components that may be needed or included. In other embodiments, the components and/or functions described in conjunction with FIGS. 2-5 may be included in other components (shown or not shown) or placed in subcomponents without departing from the spirit or scope of aspects of the subject matter described herein. In some embodiments, the components and/or functions described in conjunction with FIGS. 2-5 may be distributed across multiple devices.

Figure 2:
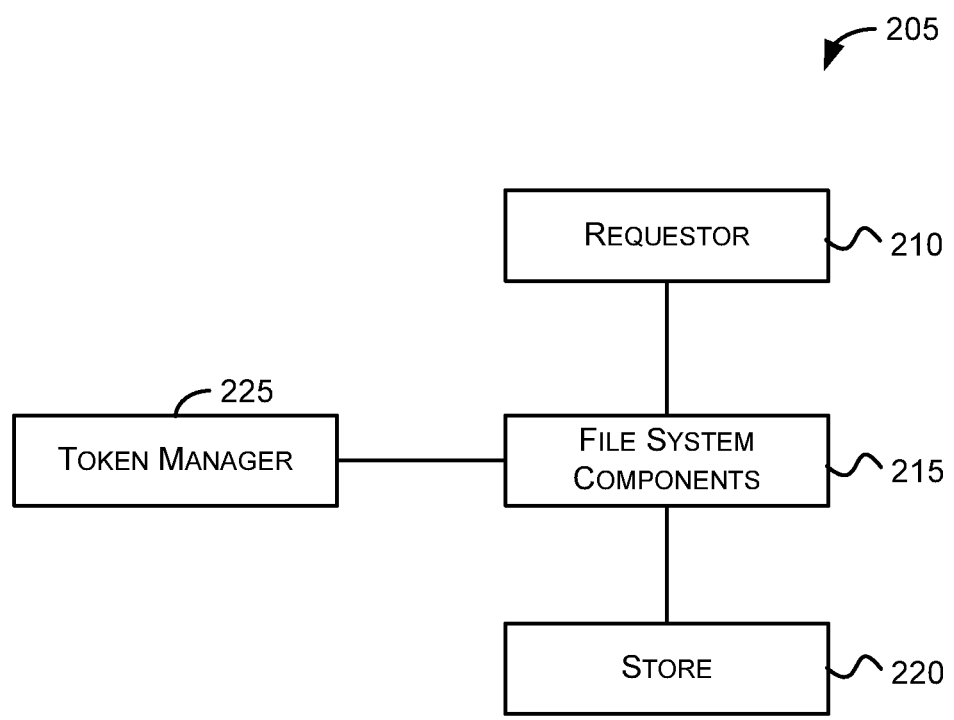
FIGS. 2-5 are block diagrams that represent exemplary arrangements of components of systems in which aspects of the subject matter described herein may operate.

Turning to FIG. 2, the system 205 may include a requestor 210, data access components 215, a token manager 225, a store 220, and other components (not shown). The system 205 may be implemented via one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the system 205 comprises a single device, an exemplary device that may be configured to act as the system 205 comprises the computer 110 of FIG. 1. Where the system 205 comprises multiple devices, one or more of the multiple devices may comprise a similarly or differently configured computer 110 of FIG. 1.

The data access components 215 may be used to transmit data to and from the store 220. The data access components 215 may include, for example, one or more of: I/O managers, filters, drivers, file server components, components on a storage area network (SAN) or other storage device, and other components (not shown). A SAN may be implemented, for example, as a device that exposes logical storage targets, as a communication network that includes such devices, or the like.

In one embodiment, a data access component may comprise any component that is given an opportunity to examine I/O between the requestor 210 and the store 220 and that is capable of changing, completing, or failing the I/O or performing other or no actions based thereon. For example, where the system 205 resides on a single device, the data access components 215 may include any object in an I/O stack between the requestor 210 and the store 220. Where the system 205 is implemented by multiple devices, the data access components 215 may include components on a device that hosts the requestor 210, components on a device that provides access to the store 220, and/or components on other devices and the like. In another embodiment, the data access components 215 may include any components (e.g., such as a service, database, or the like) used by a component through which the I/O passes even if the data does not flow through the used components.

As used herein, the term component is to be read to include all or a portion of a device, a collection of one or more software modules or portions thereof, some combination of one or more software modules or portions thereof and one or more devices or portions thereof, and the like.

In one embodiment, the store 220 is any storage media capable of storing data. The store 220 may include volatile memory (e.g., a cache) and non-volatile memory (e.g., a persistent storage). The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, commands, other data, or the like.

The store 220 may comprise hard disk storage, solid state, or other non-volatile storage, volatile memory such as RAM, other storage, some combination of the above, and the like and may be distributed across multiple devices (e.g., multiple SANs, multiple file servers, a combination of heterogeneous devices, and the like). The devices used to implement the store 220 may be located physically together (e.g., on a single device, at a datacenter, or the like) or distributed geographically. The store 220 may be arranged in a tiered storage arrangement or a non-tiered storage arrangement. The store 220 may be external, internal, or include components that are both internal and external to one or more devices that implement the system 205. The store 220 may be formatted (e.g., with a file system) or non-formatted (e.g., raw).

In another embodiment, the store 220 may be implemented as a storage abstraction rather than as direct physical storage. A storage abstraction may include, for example, a file, volume, disk, virtual disk, logical unit, data stream, alternate data stream, metadata stream, or the like. For example, the store 220 may be implemented by a server having multiple physical storage devices. In this example, the server may present an interface that allows a data access component to access data of a store that is implemented using one or more of the physical storage devices or portions thereof of the server.

This level of abstraction may be repeated to any arbitrary depth. For example, the server providing a storage abstraction to the data access components 215 may also rely on a storage abstraction to access and store data.

In another embodiment, the store 220 may include a component that provides a view into data that may be persisted or non-persisted in non-volatile storage.

One or more of the data access components 215 may reside on an apparatus that hosts the requestor 210 while one or more other of the data access components 215 may reside on an apparatus that hosts or provides access to the store 220. For example, if the requestor 210 is an application that executes on a personal computer, one or more of the data access components 215 may reside in an operating system hosted on the personal computer. As another example, if the store 220 is implemented by a storage area network (SAN), one or more of the data access components 215 may implement a storage operating system that manages and/or provides access to the store 220. When the requestor 210 and the store 220 are hosted in a single apparatus, all or many of the data access components 215 may also reside on the apparatus.

To initiate an offload read (described below) of data of the store 220, the requestor 210 may send a request to obtain a token representing the data using a predefined command (e.g., via an API). In response, one or more of the data access components 215 may respond to the requestor 210 by providing one or more tokens that represents the data or a subset thereof.

For example, for various reasons it may be desirable to return a token that represents less data than the originally requested data. When a token is returned, it may be returned with a length or even multiple ranges of data that the token represents. The length may be smaller than the length of data originally requested.

One or more of the data access components 215 may operate on less than the requested length associated with a token on either an offload read or offload write. The length of data actually operated on is sometimes referred to herein as the "effective length." Operating on less than the requested length may be desirable for various reasons. The effective length may be returned so that the requestor or other data access components are aware of how many bytes were actually operated on by the command.

The data access components 215 may act in various ways in response to an offload read or write including, for example:

1. A partitioning data access component may adjust the offset of the offload read or write request before forwarding the request to the next lower data access component.
2. A RAID data access component may split the offload read or write request and forward the pieces to the same or different data access components. In the case of RAID-0, a received request may be split along the stripe boundary (resulting in a shorter effective length) whereas in the case of RAID-1, the entire request may be forwarded to more than one data access components (resulting in multiple tokens for the same data).
3. A caching data access component may write out parts of its cache that include the data that is about to be obtained by the offload read request.
4. A caching data access component may invalidate those parts of its cache that include the data that is about to be overwritten by an offload write request.
5. A data verification data access component may invalidate any cached checksums of the data that are about to be overwritten by the offload write request.
6. An encryption data access component may fail an offload read or write request.
7. A snapshot data access component may copy the data in the location that is about to overwritten by the offload write request. This may be done, in part, so that the user can later 'go back' to a 'previous version' of that file if necessary. The snapshot data access component may itself use offload read and write commands to copy the data in the location (that is about to be overwritten) to a backup location. In this example, the snapshot data access component may be considered a "downstream requestor" (described below).

The examples above are not intended to be all-inclusive or exhaustive. Based on the teachings herein, those skilled in the art may recognize other scenarios in which the teachings herein may be applied without departing from the spirit or scope of aspects of the subject matter described herein.

If a data access component 215 fails an offload read or write, an error code may be returned that allows another data access component or the requestor to attempt another mechanism for reading or writing the data. Capability discovery may be performed during initialization, for example. When a store or even lower layer data access components do not support a particular operation, other actions may be performed by an upper data access component or a requestor to achieve the same result. For example, if a storage system (described below) does not support offload reads and writes, a data access component may manage tokens and maintain a view of the data such that upper data access components are unaware that the store or lower data access component does not provide this capability.

A requestor may include an originating requestor or a downstream requestor. For example, a requestor may include an application that requests a token so that the application can perform an offload write. This type of requestor may be referred to as an originating requestor. As another example, a requestor may include a server application (e.g., such as a Server Message Block (SMB) server) that has received a copy command from a client. The client may have requested that data be copied from a source store to a destination store via a copy command. The SMB server may receive this request and in turn use offload reads and writes to perform the copy. In this case, the requestor may be referred to as a downstream requestor.

As used herein, unless specified otherwise or clear from the context, the term requestor is to be read to include both an originating requestor and a downstream requestor. An originating requestor is a requestor that originally sent a request for an offload read or write. In other words, the term requestor is intended to cover cases in which there are additional components above the requestor to which the requestor is responding to initiate an offload read as well as cases in which the requestor is originating the offload read or write on its own initiative.

For example, an originating requestor may be an application that desires to transfer data from a source to a destination. This type of originating requestor may send one or more offload read and write requests to the data access components 215 to transfer the data.

A downstream requestor is a requestor that issues one or more offload reads or writes to satisfy a request from another requestor. For example, one or more of the data access components 215 may act as a downstream requestor and may initiate one or more offload reads or writes to fulfill requests made from another requestor. Some examples of downstream requestors have been given above in reference to RAID-0, partitioning, and snapshot data access components although these examples are not intended to be all-inclusive or exhaustive.

In one embodiment, a token comprises a random or pseudo random number that is difficult to guess. The difficulty of guessing the number may be selected by the size of the number as well as the mechanism used to generate the number. The number represents data on the store 220 but may be much smaller than the data. For example, a requestor may request a token for a 100 Gigabyte file. In response, the requestor may receive, for example, a 512 byte or other sized token.

As long as the token is valid, the token represents the data. In some implementations, the token may represent the data as it logically existed when the token was bound to the data. The term logically is used as the data may not all reside in the store or even be persisted. For example, some of the data may be in a cache that needs to be flushed before the token can be provided. As another example, some of the data may be derived from other data. As another example, data from disparate sources may need to be combined or otherwise manipulated to create the data represented by the token. The binding may occur after a request for a token is received and before or at the time the token is returned.

In other implementations, the data represented by the token may change. The behavior of whether the data may change during the validity of the token may be negotiated with the requestor or between components. This is described in more detail below.

A token may expire and thus become invalidated or may be explicitly invalidated before expiring. For example, if a file represented by the token is closed, the computer hosting the requestor 210 is shut down, a volume having data represented by the token is dismounted, the intended usage of the token is complete, or the like, a message may be sent to explicitly invalidate the token.

In some implementations, the message to invalidate the token may be treated as mandatory and followed. In other implementations, the message to invalidate the token may be treated as a hint which may or may not be followed. After the token is invalidated, it may no longer be used to access data.

A token may be protected by the same security mechanisms that protect the data the token represents. For example, if a user has rights to open and read a file, this may allow the user to obtain a token that allows the user to copy the file elsewhere. If a channel is secured for reading the file, the token may be passed via a secured channel. If the data may be provided to another entity, the token may be passed to the other entity just as the data could be. The receiving entity may use the token to obtain the data just as the receiving entity could have used the data itself were the data itself sent to the receiving entity.

The token may be immutable. That is, if the token is changed in any way, it may no longer be usable to access the data the token represented.

In one embodiment, only one token is provided that represents the data. In another embodiment, however, multiple tokens may be provided that each represents portions of the data. In yet another embodiment, portions or all of the data may be represented by multiple tokens. These tokens may be encapsulated in another data structure or provided separately.

In the encapsulated case, a non-advanced requestor may simply pass the data structure back to a data access component when the requestor seeks to perform an operation (e.g., offload write, token invalidation) on the data. A more advanced requestor 210 may be able to re-arrange tokens in the encapsulated data structure, use individual tokens separately from other tokens to perform data operations, or take other actions when multiple tokens are passed back.

After receiving a token, the requestor 210 may request that all or portions of the data represented by the token be logically written. Sometimes herein this operation is called an offload write. The requestor 210 may do this by sending the token together with one or more offsets and lengths to the data access components 215.

For an offload write, for each token involved, a token-relative offset may be indicated as well as a destination-relative offset. Either or both offsets may be implicit or explicit. A token-relative offset may represent a number of bytes (or other units) from the beginning of data represented by the token, for example. A destination-relative offset may represent the number of bytes (or other units) from the beginning of data on the destination. A length may indicate a number of bytes (or other units) to copy starting at the offset.

One or more of the data access components 215 may receive the token, verify that the token represents data on the store, and if so logically write the portions of data represented by the token according to the capabilities of a storage system that hosts the underlying store 220. The storage system that hosts the underlying store 220 may include one or more SANs, dedicated file servers, general servers or other computers, network appliances, any other devices suitable for implementing the computer 110 of FIG. 1, and the like.

For example, if the store 220 is hosted via a storage system such as a SAN and the requestor 210 is requesting an offload write to the SAN using a token that represents data that exists on the SAN, the SAN may utilize a proprietary mechanism of the SAN to logically write the data without making another physical copy of the data. For example, reference counting or another mechanism may be used to indicate the number of logical copies of the data. For example, reference counts may be used at the block level where a block may be logically duplicated on the SAN by increasing a reference count of the block.

As another example, the store 220 may be hosted via a storage system such as a file server that may have other mechanisms useful in performing an offload write such that the offload write does not involve physically copying the data.

As yet another example, the store 220 may be hosted via a "dumb" storage system that physically copies the data from one location to another location of the storage system in response to an offload write.

The examples above are not intended to be all-inclusive or exhaustive. Indeed, from the point of view of a requestor, it may be irrelevant how the storage system implements a data transfer corresponding to the offload write.

As noted previously, the data transfer operation of the storage system may be time delayed. In some scenarios the data transfer operation may not occur at all. For example, the storage system may quickly respond that an offload write has completed but may receive a command to trim the underlying store before the storage system has actually started the data transfer. In this case, the data transfer operation at the storage system may be cancelled.

The requestor 210 may share the token with one or more other entities. For example, the requestor may send the token to an application hosted on an apparatus external to the apparatus upon which the requestor 210 is hosted. This application may then use the token to write data in the same manner that the requestor 210 could have. This scenario is illustrated in FIG. 5.

Figure 5:
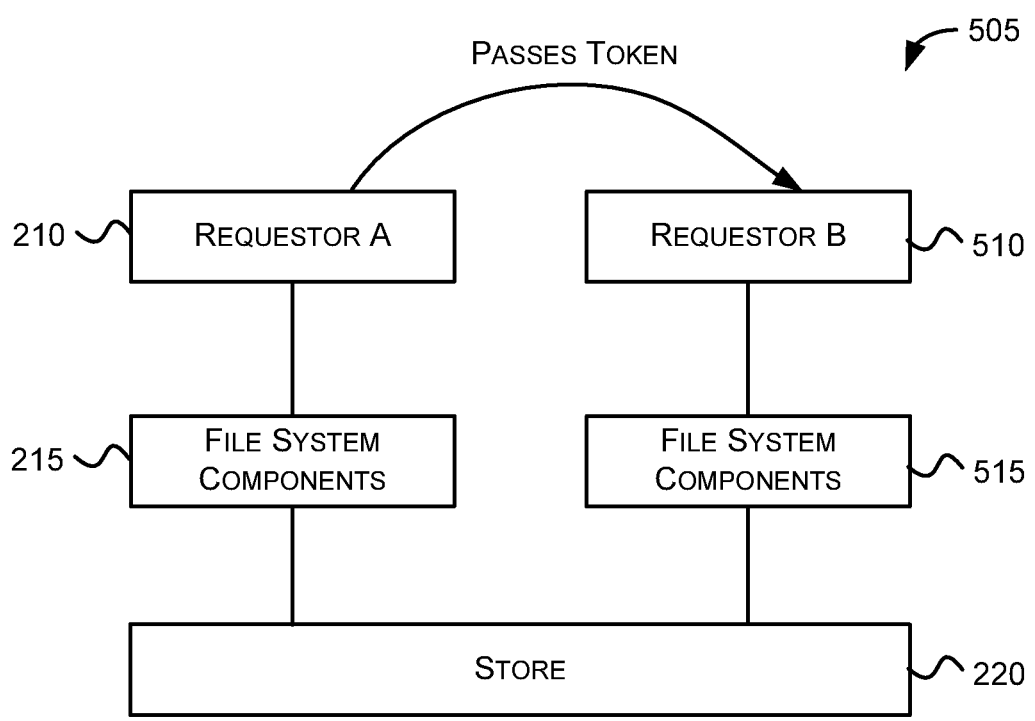

Turning to FIG. 5, using the data access components 215, the requestor 210 requests and obtains a token representing data on the store 220. The requestor 210 then passes this token to the requestor 510. The requestor 510 may then write the data by sending the token via the data access components 515.

One or more of the data access components 215 and 515 may be the same. For example, if the requestors 210 and 510 are hosted on the same apparatus, all of the data access components 215 and 515 may be the same for both requestors. If the requestors 210 and 510 are hosted on different apparatuses, some components may be the same (e.g., components that implement an apparatus hosting or providing access to the store 220) while other components may be different (e.g., components on the different apparatuses).

Returning to FIG. 2, in one embodiment, one or more of the data access components 215 may include or consult with a token manager (e.g., such as the token manager 225). A token manager may include one or more components that may generate or obtain tokens that represent the data on the store 220, provide these tokens to an authorized requestor, respond to requests to write data using the tokens, and determine when to invalidate a token. As described in more detail below, a token manager may be distributed across multiple devices such that logically the same token manager is used both to obtain a token in an offload read and use the token in an offload write. In this case, distributed components of the token manager may communicate with each other to obtain information about tokens as needed. In one embodiment, a token manager may generate tokens, store the tokens in a token store that associates the tokens with data on the store 220, and verify that tokens received from requestors are found in the token store.

The token manager 225 may associate tokens with data that identifies where the data may be found. This data may also be used where the token manager 225 is distributed among multiple devices to obtain token information (what data the token represents, if the token has expired, other data, and the like) from distributed components of the token manager 225. The token manager 225 may also associate a token with a length of the data to ensure, in part, that a requestor is not able to obtain data past the end of the data associated with a token.

If data on the store 220 is changed or deleted, the token manager 225 may take various actions, depending on how the token manager 225 is configured. For example, if configured to preserve the data represented by a token, the token manager 225 may ensure that a copy of the data that existed at the time the token was generated is maintained. Some storage systems may have sophisticated mechanisms for maintaining such copies even when the data has changed. In this case, the token manager 225 may instruct the storage system (of which the store 220 may be part) to maintain a copy of the original data for a period of time or until instructed otherwise.

In other cases, a storage system may not implement a mechanism for maintaining a copy of the original data. In this case, the token manager 225 or another of the data access components 215 may maintain a copy of the original data for a period of time or until instructed otherwise.

Note that maintaining a copy of the original data may involve maintaining a logical copy rather than a duplicate copy of the original data. A logical copy includes data that may be used to create the exact copy. For example, a logical copy may include a change log together with the current state of the data. By applying the change log in reverse to the current state, the original copy may be obtained. As another example, copy-on-write techniques may be used to maintain a logical copy that can be used to reconstruct the original data. The examples above are not intended to be limiting as it will be understood by those skilled in the art that there are many ways in which a logical copy could be implemented without departing from the spirit or scope of aspects of the subject matter described herein.

The token manager 225 may be configured to invalidate the token when the data changes. In this case, in conjunction with allowing data associated with the token to change, the token manager 225 may indicate that the token is no longer valid. This may be done, for example, by deleting or marking the token as invalid in the token store. If the token manager 225 is implemented by a component of the storage system, one or more failure codes may be passed to one or more other data access components and passed to the requestor 210.

The token manager 225 may manage expiration of the token. For example, a token may have a time to live. After the time to live has expired, the token may be invalidated. In another embodiment, the token may remain valid depending on various factors including:

1. Storage constraints. Maintaining original copies of the data may consume space over a threshold. At that point, one or more tokens may be invalidated to reclaim the space.

2. Memory constraints. The memory consumed by maintaining multiple tokens may exceed a threshold. At that point, one or more tokens may be invalidated to reclaim memory space.

3. Number of tokens. A system may allow a set number of active tokens. After the maximum number of tokens is reached, the token manager may invalidate an existing token prior to providing another token.

4. Input/Output (IO) overhead. The IO overhead of having too many tokens may be such that a token manager may invalidate one or more tokens to reduce IO overhead.

5. IO Cost/Latency. A token may be invalidated based on cost and/or latency of a data transfer from source to destination. For example, if the cost exceeds a threshold the token may be invalidated. Likely, if the latency exceeds a threshold, the token may be invalided.

6. Priority. Certain tokens may have priority over other tokens. If a token is to be invalidated, a lower priority token may be invalidated. The priority of tokens may be adjusted based on various policies (e.g., usage, explicit or implicit knowledge about token, request by requestor, other policies, or the like).

7. Storage provider request. A storage provider (e.g., SAN) may request a reduction in number of active tokens. In response, the token manager may invalidate one or more tokens as appropriate.

A token may be invalidated at any time before or even after one or more offload writes based on the token have succeeded.

In one embodiment, a token includes only a value that represents the data. In another embodiment, a token may also include or be associated with other data. This other data may include, for example, data that can be used to determine a storage device, storage system, or other entity from which the data may be obtained, identification information of a network storage system, routing data and hints, information regarding access control mechanisms, checksums regarding the data represented by the token, type of data (e.g., system, metadata, database, virtual hard drive, and the like), access patterns of the data (e.g., sequential, random), usage patterns (e.g., often, sometimes, rarely accessed and the like), desired alignment of the data, data for optimizing placement of the data during offload write (e.g., in hybrid environments with different types of storage devices), and the like.

The above examples are not intended to be all-inclusive or exhaustive of the other data that may be included in or associated with a token. Indeed based on the teachings herein, those skilled in the art may recognize other data that may be conveyed with the token without departing from the spirit or scope of aspects of the subject matter described herein.

A read/write request to a store may internally result in splitting of read requests to lower layers of the storage stack as file fragment boundaries, RAID stripe boundaries, volume spanning boundaries, and the like are encountered. This splitting may occur because the source/destination differs across the split, or the offset translation differs across the split. This splitting may be hidden by the splitter by not completing a request that needs to be split until the resulting split IOs are all completed.

This hiding of the splitting to within the splitting layer in the storage stack is convenient in that the layers above in the storage stack do not need to know about the splitting. With the token-based approach described herein, in one embodiment, splitting may be visible. In particular, if splitting occurs due to source/destination differing across the split, then the offload providers (described below) may differ across the split. For example, where data is duplicated (or even not duplicated), there may be multiple offload providers that provide access to the data. As another example, there may be multiple file servers that front a SAN. In addition to the SAN, one or more of the servers or other data access components may be considered an offload provider.

An offload provider is a logical entity (possibly including multiple components spread across multiple devices) that provides access to data associated with a store—source or destination. Access as used herein may include reading data, writing data, deleting data, updating data, a combination including two or more of the above, and the like. Logically, an offload provider is capable of performing an offload read or write. Physically, an offload provider may include one or more of the data access components 215 and may also include the token manager 225.

An offload provider may transfer data from a source store, write data to a destination store, and maintain data to be provided upon receipt of a token associated with the data. In some implementations, an offload provider may indicate that an offload write command is completed after the data has been logically written to the destination store. In addition, an offload provider may indicate that an offload write command is completed but defer physically writing data associated with the offload write until convenient.

When data is split, an offload provider may provide access to a portion of the requested data, but not provide access to another portion of the requested data. In this case, separate tokens may be provided for the portion before the split point and the portion after the split point. Other implementation-dependent constraints in layers of the storage stack or in offload providers may result in inability of a token to span across split ranges for other reasons. Because the requestor may see the token(s) returned from a read, in this embodiment, splitting may be visible to the requestor.

Following are two exemplary approaches to dealing with splitting:

1. A read request may return more than one token where each token is associated with a different range of the data requested. These multiple tokens may be returned in a single data structure as mentioned previously. When the requestor seeks to write data, it may pass the data structure as a whole or, if acting in an advanced way, just one or more tokens in the data structure.

2. If a single token is returned, the token may represent a shortened range of the data originally requested. The requestor may then use the token to perform one or more offload writes within the length limits of the shortened range.

When an offload write is requested, the length of the requested write may also be truncated. For both reads and writes, a requestor may make a request for another range starting at an offset not handled by a previous request. In this manner, the requestor may work through the requestor's overall needed range.

The above approaches are exemplary only. Based on the teachings herein, those skilled in the art may recognize other approaches for dealing with splitting that may be utilized without departing from the spirit or scope of aspects of the subject matter described herein.

There may be multiple offload providers in the same stack. For a given range returned from an offload read request (possibly the only range, in the case of range truncation), there may be multiple offload providers willing to provide a token. In one embodiment, these multiple tokens for the same data may be returned to a requestor and used by the requestor in an offload write.

For example, the requestor may select one of the tokens for use in an offload write. By passing only one token to an offload provider the requestor may, in this manner, determine the source offload provider that is used to obtain the data from. In another example, the requestor may pass two or more of the tokens to a destination offload provider. The destination offload provider may then select one or more of the source offload providers associated with the tokens from which to obtain the data represented by the tokens.

In another example, multiple tokens may be returned to enable both offloaded copy of bulk data, and offloaded copying of other auxiliary data in addition to bulk data. One example of auxiliary data is metadata regarding the data. For example, a file system offload provider may specify that an offload write request include two tokens (e.g., a primary data token and a metadata token) to successfully be used on the destination stack in order for the overall offload copy to succeed.

In contrast, multiple tokens used for the purpose of supporting multiple bulk data offload providers in the stack may require that only one token be used on the destination stack in order to for an offload write to succeed.

When multiple offload providers are available to transfer data from the source to destination, the requestor may be able to select one or more specific offload providers of the available ones. In one embodiment, this may involve using a skip N command where "skip N" indicates skip the first N offload providers. In another embodiment, there may be another mechanism used (e.g., an ID of the offload provider) to identify the specific offload provider(s). In yet another embodiment, selecting one of many tokens may be used to select the offload provider(s) to copy the data as some offload providers may not be able to copy data represented by the token while others may be able to do so.

In some embodiments, where more than one offload provider is available to copy data represented by a token, the first, last, random, least loaded, most efficient, lowest latency, or otherwise determined offload provider may be automatically selected.

A token may represent data that begins at a certain sector of a hard disk or other storage medium. The data the token represents may be an exact multiple of sectors but in many cases will not be. If the token is used in a file operation for data past the end of its length, the data returned may be null, 0, or some other indication of no data. Thus, if a requestor attempts to copy past the end of the data represented by the token, the requestor may not through this mechanism obtain data that physically resides just past the end of the data.

A token may be used to offload the zeroing of a large file. For example, a token may represent null, 0, or another "no data" file. By using this token in an offload write, the token may be used to initialize a file or other data.

Figure 3:
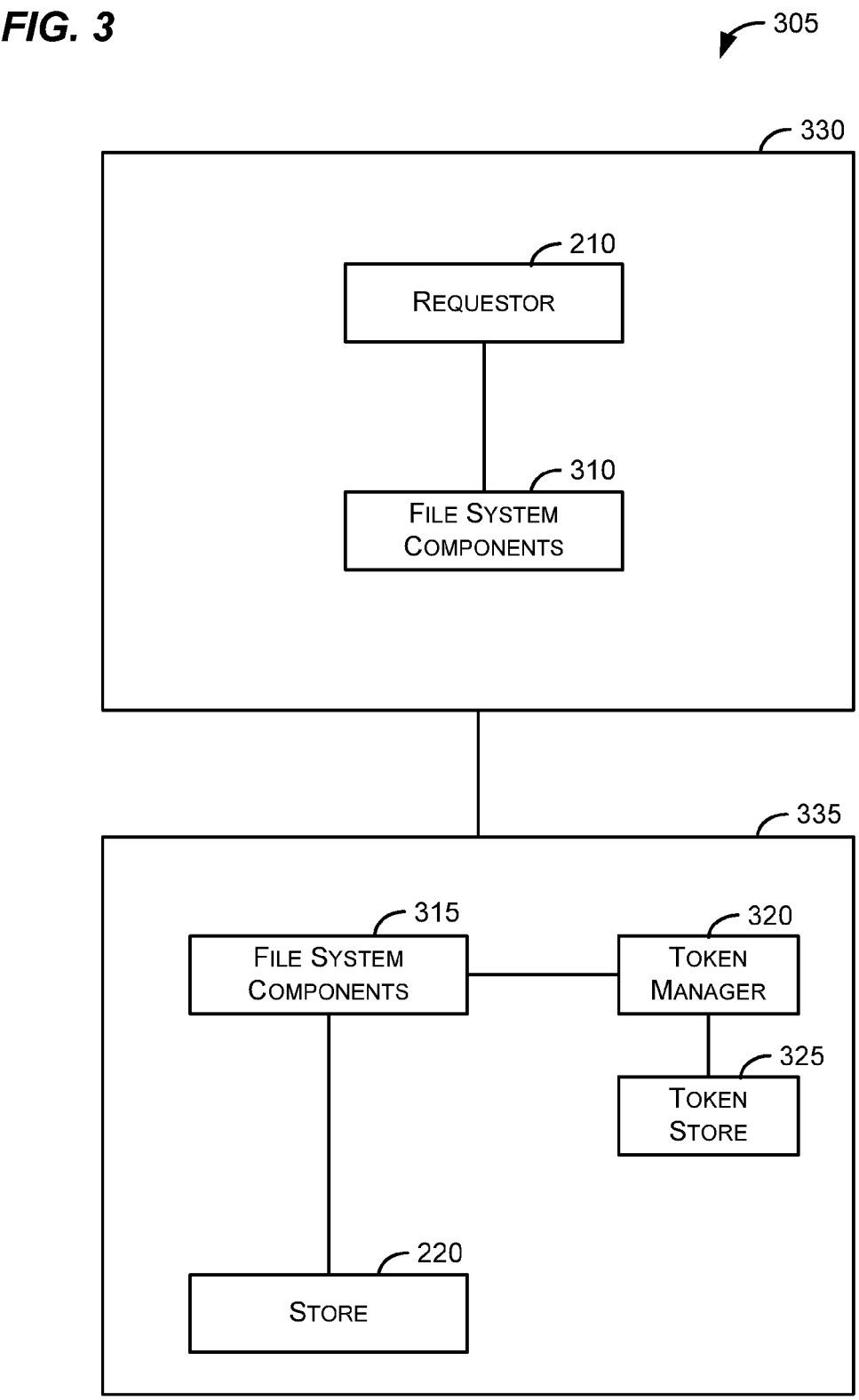

FIG. 3 is a block diagram that generally represents an exemplary arrangement of components of systems in which a token manager is hosted by the device that hosts the store. As illustrated the system 305 includes the requestor 210 and the store 220 of FIG. 2. The data access components 215 of FIG. 3 are divided between the data access components 310 that reside on the device 330 that hosts the requestor 210 and the data access components 315 that reside on the device 335 that hosts the store 220. In another embodiment, where the store 220 is external to the device 335, there may be additional data access components that provide access to the store 220.

The device 335 may be considered to be an offload provider as this device includes the needed components for providing a token and writing data given the token.

The token manager 320 may generate and validate tokens as previously described. For example, when the requestor 210 asks for a token for data on the store 220, the token manager 320 may generate a token that represents the data. This token may then be sent back to the requestor 210 via the data access components 310 and 315.

In conjunction with generating a token, the token manager 320 may create an entry in the token store 325. This entry may associate the token with data that indicates where on the store 220 the data represented by the token may be found. The entry may also include other data used in managing the token such as when to invalidate the token, a time to live for the token, other data, and the like.

When the requestor 210 or any other entity provides the token to the token manager 320, the token manager may perform a lookup in the token store 325 to determine whether the token exists. If the token exists and is valid, the token manager 320 may provide location information to the data access components 315 so that these components may logically write the data as requested.

Where multiple physical devices provide access to the store 220, the token manager 320 and/or the token store 325 may have components that are hosted by one or more of the physical devices. For example, the token manager 320 may replicate token state across devices, may have a centralized token component that other token components consult, may have a distributed system in which token state is provided from peer token managers on an as-needed basis, or the like.

Logically, the token manager 320 manages tokens. Physically, the token manager 320 may be hosted by a single device or may have components distributed over two or more devices. The token manager 320 may be hosted on a device that is separate from any devices that host the store 220. For example, the token manager 320 may exist as a service that data access components 315 may call to generate and validate tokens and provide location information associated therewith.

In one embodiment, the token store 325 may be stored on the store 220. In another embodiment, the token store 325 may be separate from the store 220.

Figure 4:
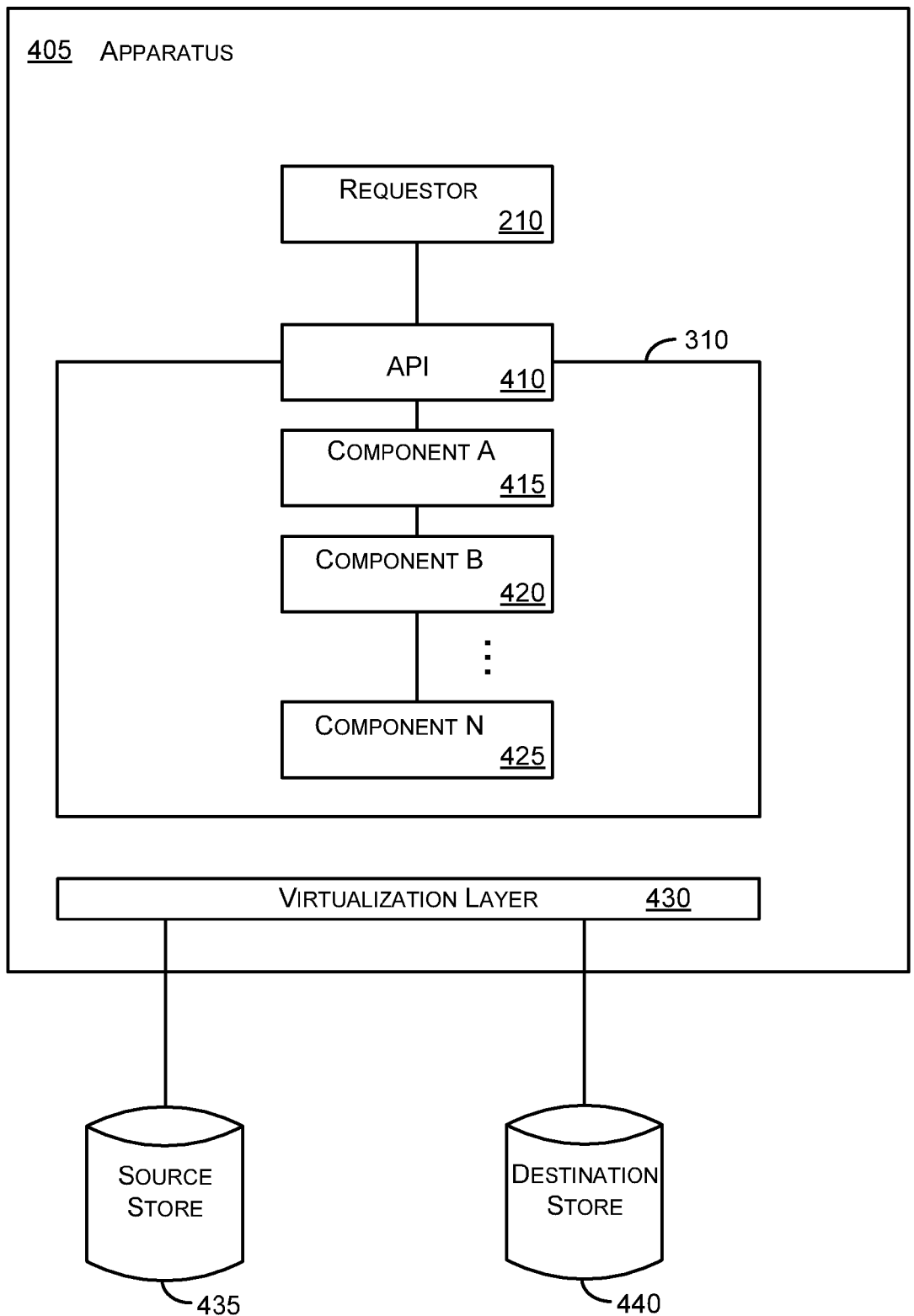

FIG. 4 is a block diagram that generally represents another exemplary arrangement of components of systems that operates in accordance with aspects of the subject matter described herein. As illustrated, the apparatus 405 hosts the requestor 210 as well as data access components 310 and a virtualization layer 430. The data access components 310 are arranged in a stacked manner and include N components that include components 415, 420, 425, and other components (not shown). The number N is variable and may vary from apparatus to apparatus.

The requestor 210 accesses one or more of the data access components 310 via the application programming interface (API) 410. The virtualization layer 430 indicates that the requestor or any of the data access components may reside in a virtual machine environment.

A virtual machine environment is an environment that is simulated or emulated by a computer. The virtual machine environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth.

Files in a virtual hard drive, floppy, CD, or other virtual storage device may be backed with physical media that may be local or remote to the apparatus 405. The virtualization layer 430 may arrange data on the physical media and provide the data to the virtual machine environment in a manner such that one or more components accessing the data are unaware that they are accessing the data in a virtual machine environment.

More than one virtual machine environment may be hosted on a single computer. That is, two or more virtual machine environments may execute on a single physical computer. To software executing in each virtual machine environment, the virtual machine environment appears to have its own resources (e.g., hardware) even though the virtual machine environments hosted on a single computer may physically share one or more physical devices with each other and with the hosting operating system.

A virtual storage environment is a mechanism which provides one or more virtual storage containers abstracted from physical storage hardware. The virtual storage environment translates from virtual storage container identifiers and offsets to virtual or physical storage devices and offsets, and services reads, writes, and other storage commands issued to virtual storage containers. For example, a SAN device based on physical disks plus RAM, and which exposes logical units, implements a virtual storage environment, with the logical units being the virtual storage containers.

Another example of a virtual storage environment is a software-based distributed virtual disk pool which exposes virtual disk containers. Such a software-based virtual disk pool may itself store data in other software-based virtual disk pools or SAN devices.

A virtual storage environment may, but is not required, to provide disk-like virtual storage containers. For example, instead of, or in addition to, providing one or more disk-like virtual storage containers, a virtual storage environment may provide one or more file-like virtual storage containers.

An example of a one virtual storage environment is a virtual disk mechanism, in which data for virtual disks is stored in a file or set of files. The physical persistent storage used to back the virtual storage environment may be stored using any type of data storage physical device, including RAM, SSDs, rotational hard drives, and other storage previously mentioned in conjunction with FIG. 1. The data may be stored in a further storage abstraction (e.g. a database, file, virtual disk, logical unit, or the like), used opaquely by the virtual storage environment. The data backing a virtual storage container may be compressed, including the possibility of sparsely representing runs of zero, sparsely representing undefined data, de-duplicating otherwise redundant data, and the like.

A file system is one example of a virtual storage environment. A virtual storage container may be byte addressed or block addressed, and container IDs may be addressed using a more complex addressing and lookup scheme, such as a database schema. For example, a file system virtual storage environment may provide a namespace of files, in addition to byte and block offsets within specific files. As another example, a single physical rotational disk is itself a virtual storage environment, in that it translates from virtual disk offsets (LBAs) to the physical location of each sector on one or more rotating magnetic physical media. A virtual storage container is sometimes referred to herein simply as "virtual storage."

Unless the context dictates otherwise, the term virtual environment is meant to refer to a virtual storage environment. A virtual storage environment may be used by a virtual machine environment. Furthermore, the term logical disk may include physical and/or virtual storage. A logical disk may refer to a physical disk, SSD, or other volatile or non-volatile storage, a virtual disk based on a virtual hard drive (VHD), a virtual storage container, multiples of one or more of the above, combinations of two or more of the above, and the like.

Physical storage may include, for example, a device or set of devices that contain physical data storage media (e.g., RAM, flash, magnetic platters, other volatile and non-volatile memory, and the like). The device or set of devices may provide logical disk interfaces to access the underlying data storage media. In physical storage, the association of a particular piece of non-volatile data storage media to a particular logical disk may change infrequently or not at all. When the association does change, it may, for example, change as a result of explicit management operations, such as rebuilding a RAID set, or adding a RAID volume to a disk set when the disk set already has sufficient room for an additional RAID volume.

For physical storage, the association of a piece of non-volatile data storage media to a particular logical disk offset may change frequently, automatically, and without any explicit management operations. The association of volatile data storage media with logical disks may operate as a disk cache. The volatile data storage media may be substantially smaller in capacity than the non-volatile data storage media. Battery back-up for the volatile data storage media may allow the cache in volatile data storage media to service flush commands without having committed the data to fully non-volatile data storage media.

Some examples of physical storage include hard drives, RAID arrangements implemented in software, RAID arrangements including a RAID controller card, RAID arrangements implemented with a controller local to a drive enclosure, other RAID arrangements, SSDs, hybrid drives, and the like. The examples above are not intended to be all-inclusive or exhaustive. Indeed, based on the teachings herein, those skilled in the art may recognize other physical storage that may be also be used in accordance with aspects of the subject matter described herein.

The source store 435 represents the store from which the requestor 210 is requesting a token. The destination store 440 represents the store to which the requestor requests that data be written using the token. In implementation, the source store 435 and the destination store 440 may be implemented as a single store (e.g., a SAN with multiple volumes) or two or more stores. Where the source store 435 does not support maintaining a copy of the original data, one or more of the components 415-425 may operate to maintain a copy of the original data during the lifetime of the token.

When the source store 435 and the destination store 440 are implemented as two separate stores, additional components (e.g., storage server or other components) may transfer the data from the source store 435 to the destination store 440 without involving the apparatus 405. In one embodiment, however, even when the source store 435 and the destination store 440 are implemented as two separate stores, one or more of the data access components 310 may act to copy data from the source store 435 to the destination store 440. The requestor 210 may be aware or unaware, informed or non-informed, of how the underlying copying is performed.

There may be multiple paths between the requestor 210 and the source store 435 and/or the destination store 440. In one embodiment, the token methodology described herein is independent of the path taken provided that information indicating the data represented (e.g., available via the token manager) is available. In other words, if the requestor 210 has a path that passes through the virtualization layer 430, a network path that does not pass through the virtualization layer 430, an SMB path, or any other path to the source or destination stores, the requestor 210 may use one or more of these paths to issue an offload write to the destination store 440. In other words, the path taken to the source store and the path taken to the destination store may be the same or different.

In the offload write, the token is passed together with one or more offsets and lengths of data to write to the destination store 440. A data access component (not necessarily one of the data access components 310) receives the token, uses the token to obtain location information from a token manager, and may commence logically writing the data from the source store 435 to the destination store 440.

One or more of the components 415-425 or another component (not shown) may implement a token manager.

Following are some exemplary definitions of some data structures that may be used with aspects of the subject matter described herein:

```
#define FSCTL_OFFLOAD_READ CTL_CODE(FILE_DEVICE_FILE_SYSTEM, 153,
METHOD_BUFFERED, FILE_READ_ACCESS) //153 is used to indicate offload read
typedef struct _FSCTL_OFFLOAD_READ_INPUT {
    ULONG Size;
    ULONG Flags;
    ULONG TokenTimeToLive; // (e.g., in milliseconds)
    ULONG Reserved;
    ULONGLONG FileOffset;
    ULONGLONG CopyLength;
} FSCTL_OFFLOAD_READ_INPUT, *PFSCTL_OFFLOAD_READ_INPUT;
typedef struct _FSCTL_OFFLOAD_READ_OUTPUT {
    ULONG Size;
    ULONG Flags;
    ULONGLONG TransferLength;
    UCHAR Token[512]; // May be larger or smaller than 512
```

-continued

```
} FSCTL_OFFLOAD_READ_OUTPUT, *PFSCTL_OFFLOAD_READ_OUTPUT;
#define FSCTL_OFFLOAD_WRITE CTL_CODE(FILE_DEVICE_FILE_SYSTEM, 154,
METHOD_BUFFERED, FILE_WRITE_ACCESS) // 154 is used to indicate offload write
typedef struct _FSCTL_OFFLOAD_WRITE_INPUT {
    ULONG Size;
    ULONG Flags;
    ULONGLONG FileOffset;
    ULONGLONG CopyLength;
    ULONGLONG TransferOffset;
    UCHAR Token[512];
} FSCTL_OFFLOAD_WRITE_INPUT, *PFSCTL_OFFLOAD_WRITE_INPUT;
typedef struct _FSCTL_OFFLOAD_WRITE_OUTPUT {
    ULONG Size;
    ULONG Flags;
    ULONGLONG LengthWritten;
} FSCTL_OFFLOAD_WRITE_OUTPUT, *PFSCTL_OFFLOAD_WRITE_OUTPUT;
//
// This flag, when OR'd into an action indicates that the given action is
// non-destructive. If this flag is set then storage stack components which
// do not understand the action should forward the given request
//
#define DeviceDsmActionFlag_NonDestructive 0x80000000
#define IsDsmActionNonDestructive(_Action) ((BOOLEAN)((_Action &
DeviceDsmActionFlag_NonDestructive) != 0))
typedef ULONG DEVICE_DATA_MANAGEMENT_SET_ACTION;
    #define DeviceDsmAction_OffloadRead   (3 | DeviceDsmActionFlag_NonDestructive)
    #define DeviceDsmAction_OffloadWrite  4
//
// Flags that are global across all actions
//
typedef struct _DEVICE_DATA_SET_RANGE {
    LONGLONG StartingOffset;      // e.g., in bytes
    ULONGLONG LengthInBytes;      // e.g., multiple of sector size
} DEVICE_DATA_SET_RANGE, *PDEVICE_DATA_SET_RANGE;
```

Exemplary IOCTL data structures for implementing aspects of the subject matter described herein may be defined as follows:

```
//
// input structure for IOCTL_STORAGE_MANAGE_DATA_SET_ATTRIBUTES
// 1.   Value of ParameterBlockOffset or ParameterBlockLength is 0 indicates that
//      Parameter Block does not exist.
// 2.   Value of DataSetRangesOffset or DataSetRangesLength is 0 indicates that
//      DataSetRanges Block does not exist. If DataSetRanges Block exists, it contains
//      contiguous DEVICE_DATA_SET_RANGE structures.
// 3.   The total size of buffer is at least:
//      sizeof (DEVICE_MANAGE_DATA_SET_ATTRIBUTES)+ParameterBlockLength+
        DataSetRangesLength
typedef struct _DEVICE_MANAGE_DATA_SET_ATTRIBUTES {
    ULONG               Size;    // Size of structure
                                 // DEVICE_MANAGE_DATA_SET_ATTRIBUTES
    DEVICE_DATA_MANAGEMENT_SET_ACTION Action;
    ULONG               Flags;              // Global flags across all actions
    ULONG               ParameterBlockOffset;  // aligned to corresponding structure
                                              // alignment
    ULONG               ParameterBlockLength;  // 0 means Parameter Block does not
                                              // exist.
    ULONG               DataSetRangesOffset;   // aligned to
                                              // DEVICE_DATA_SET_RANGE
                                              // structure alignment.
    ULONG               DataSetRangesLength;   // 0 means DataSetRanges Block
                                              // does not exist.
} DEVICE_MANAGE_DATA_SET_ATTRIBUTES,
*PDEVICE_MANAGE_DATA_SET_ATTRIBUTES;
//
// Parameter structure definitions for copy offload actions
//
//
// Offload copy interface operates in 2 steps: offload read and offload write.
//
// Input for OffloadRead action is set of extents in DSM structure
// Output parameter of an OffloadRead is a token, returned by the target which will
// identify a "point in time" snapshot of extents taken by the target.
// Format of the token may be opaque to requestor and specific to the target.
//
```

-continued

```
// Note: a token length to 512 is exemplary. SCSI interface to OffloadCopy may enable
// negotiable size. A new action may be created for variable-sized tokens.
#define   DSM_OFFLOAD_MAX_TOKEN_LENGTH      512
            // Keep as ULONG multiple
typedef struct _DEVICE_DSM_OFFLOAD_READ_PARAMETERS {
    ULONG    Flags;
    ULONG    TimeToLive;   // token Time to live (e.g., in milliseconds); may be requested
                           // by requestor
} DEVICE_DSM_OFFLOAD_READ_PARAMETERS,
*PDEVICE_DSM_OFFLOAD_READ_PARAMETERS;
typedef struct _DEVICE_DSM_OFFLOAD_WRITE_PARAMETERS {
    ULONG Flags;
    ULONG Reserved;             // reserved for future usage
    ULONGLONG TokenOffset;      // The starting offset to copy from data represented by token
    UCHAR Token[DSM_OFFLOAD_MAX_TOKEN_LENGTH];           // the token
} DEVICE_DSM_OFFLOAD_WRITE_PARAMETERS,
*PDEVICE_DSM_OFFLOAD_WRITE_PARAMETERS;
typedef struct _STORAGE_OFFLOAD_READ_OUTPUT {
    ULONG     OffloadReadFlags;    // Outbound flags
    ULONG     Reserved;
    ULONGLONG  LengthProtected;    // The length of data represented by token, from the
                                   // lowest StartingOffset
    ULONG     TokenLength;         // Length of the token in bytes.
    UCHAR     Token[DSM_OFFLOAD_MAX_TOKEN_LENGTH];
              // The token created on success.
} STORAGE_OFFLOAD_READ_OUTPUT, *PSTORAGE_OFFLOAD_READ_OUTPUT;
//
// STORAGE_OFFLOAD_READ_OUTPUT flag definitions
//
#define STORAGE_OFFLOAD_READ_RANGE_TRUNCATED (0x0001)
typedef struct _STORAGE_OFFLOAD_WRITE_OUTPUT {
    ULONG     OffloadWriteFlags;   // Out flags
    ULONG     Reserved;            // reserved for future usage
    ULONGLONG  LengthCopied;       // Out parameter : The length of content copied from the
                                   // start of the data represented by the token
} STORAGE_OFFLOAD_WRITE_OUTPUT,
*PSTORAGE_OFFLOAD_WRITE_OUTPUT;
//
// STORAGE_OFFLOAD_WRITE_OUTPUT flag definitions - used in OffloadWriteFlags
mask
//
// Write performed, but on a truncated range
#define STORAGE_OFFLOAD_WRITE_RANGE_TRUNCATED (0x0001)
//
// DSM output structure for bi-directional actions.
//
// Output parameter block is located in resultant buffer at the offset contained in
// OutputBlockOffset field. Offset is calculated from the beginning of the buffer,
// and callee will align it according to the requirement of the action specific structure
// template.
// Example: for OffloadRead action in order to get a pointer to the output structure, a caller
// shall
//
// PSTORAGE_OFFLOAD_READ_OUTPUT pReadOut =
// (PSTORAGE_OFFLOAD_READ_OUTPUT) ((UCHAR *)pOutputBuffer +
// ((PDEVICE_MANAGE_DATA_SET_ATTRIBUTES_OUTPUT)pOutputBuffer)
// ->OutputBlockOffset)
//
typedef struct _DEVICE_MANAGE_DATA_SET_ATTRIBUTES_OUTPUT {
    ULONG Size;                    // Size of the structure
    DEVICE_DATA_MANAGEMENT_SET_ACTION Action;
              // Action requested and performed
    ULONG    Flags;           // Common output flags for DSM actions
    ULONG    OperationStatus;    // Operation status; used for offload actions
                                 // (placeholder for richer semantic, like PENDING)
    ULONG    ExtendedError;      // Extended error information
    ULONG    TargetDetailedError; // Target specific error; may be used for offload actions
                                  // (SCSI sense code)
    ULONG    ReservedStatus;     // Reserved field
    ULONG    OutputBlockOffset;  // Action specific aligned to corresponding structure
                                 // alignment.
    ULONG    OutputBlockLength;  // 0 means Output Parameter Block does not exist.
} DEVICE_MANAGE_DATA_SET_ATTRIBUTES_OUTPUT,
*PDEVICE_MANAGE_DATA_SET_ATTRIBUTES_OUTPUT;
```

Figure 6:
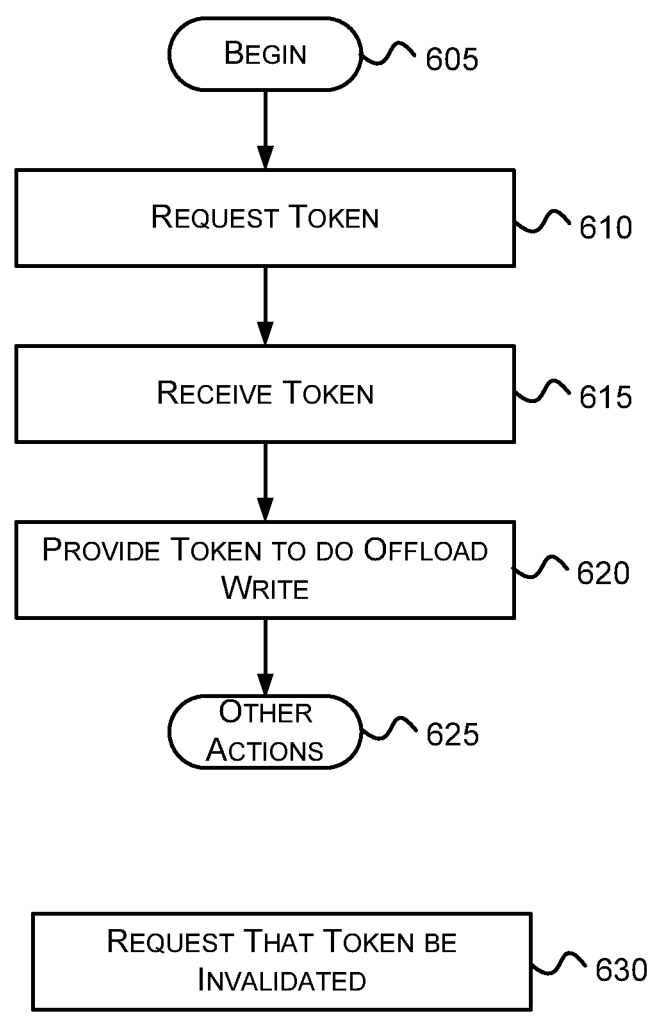
FIGS. 6-8 are flow diagrams that generally represent exemplary actions that may occur in accordance with aspects of the subject matter described herein.
Figure 7:
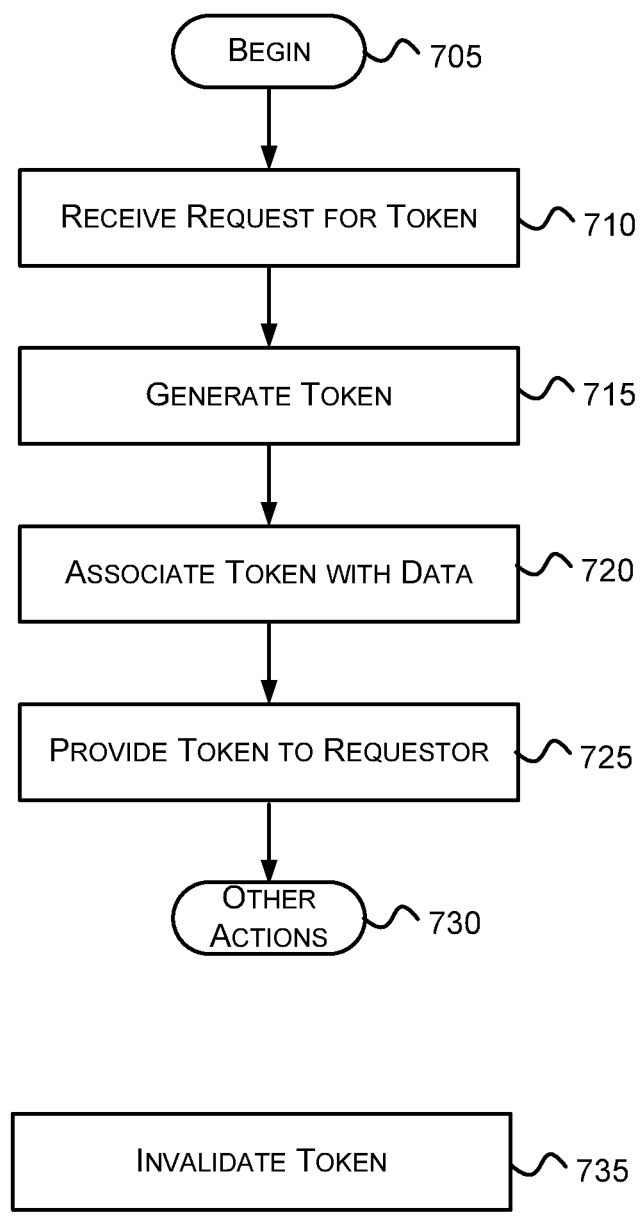
Figure 8:
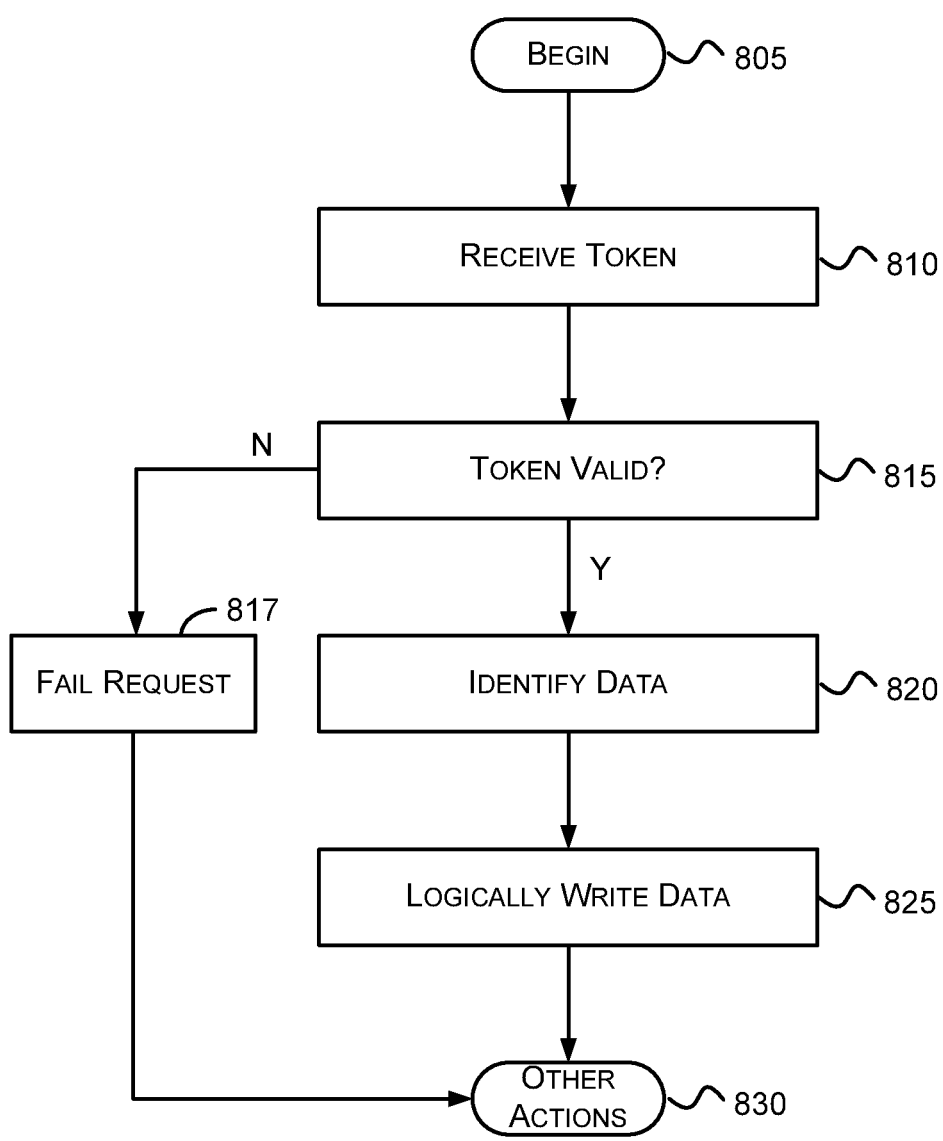

FIGS. 6-8 are flow diagrams that generally represent exemplary actions that may occur in accordance with aspects of the subject matter described herein. For simplicity of explanation, the methodology described in conjunction with FIGS. 6-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 6, at block 605, the actions begin. At block 610, a request for a representation of data of the store is received. The request is conveyed in conjunction with a description (e.g., location and length) that identifies a portion of the store. Here, the word "portion" may be all or less than all of the store. For example, referring to FIG. 2, the requestor 210 may request a token for data on the store 220. In making the request, the requestor 210 may send a location of the data (e.g., a file name, a handle to an open file, a physical offset into a file, volume, or raw disk, or the like) together with a length.

At block 615, in response to the request, a token is received that represents the data that was logically stored in the portion of the store when the token is bound to the data. As mentioned previously, the token may represent less data than requested. For example, referring to FIG. 2, one or more of the data access components 215 may return a token to the requestor 210 that represents the data requested or a subset thereof. The token may be a size (e.g., a certain number of bits or bytes) that is independent of the size of the data represented by the token. The token may be received together with other tokens in a data structure where each token in the data structure is associated with a different portion of the data or two or more tokens are associated with the same portion of the data.

Receiving the token may be accompanied by an indication that the token represents data that is a subset of the data requested. This indication may take the form, for example, of a length of the data represented by the token.

At block 620, the token is provided to perform an offload write. The token may be provided along with information indicating whether to logically write all or a portion of the data via an offload provider. This information may include, for example, a destination-relative offset, a token-relative offset, and length. An token-relative offset of 0 and length equal to the entire length of the data represented by the token may indicate to copy all of the data while any offset with a length less than the entire length of the data may indicate to copy less than the entire data.

For example, referring to FIG. 2, the requestor may pass the token to the data access components 215 that may pass the token to a token manager 225 to obtain a location of the represented data. Where the token manager 225 is part of the storage system providing access to the store 220 (e.g., in a SAN), the token may be provided to a data access component of the SAN which may then use the token to identify the data and logically write the data indicated by the request.

As mentioned previously, the offload provider may be external to the apparatus sending the request. In addition, once the offload provider receives the request, the offload provider may logically write the data independent of additional interaction with any component of the apparatus sending the request. For example, referring to FIG. 3, once the token and request to write reach the data access components 315, the components of the device 335 may logically write the data as requested without any additional assistance from the device 330.

At block 625, other actions, if any, may be performed. Note that at block 630, at any time after the token has been generated, the requestor (or another of the data access components) may explicitly request that the token be invalidated. If this request is sent during the middle of a copy operation, in one implementation, the copy may be allowed to proceed to completion. In another implementation, the copy may be aborted, an error may be raised, or other actions may occur.

Turning to FIG. 7, at block 705, the actions begin. At block 710, a request for a representation of data of a store is received. The request is conveyed in conjunction with a description that identifies a portion of the store at which the data is located. The request may be received at a component of a storage area network or at another data access component. For example, referring to FIG. 3, one or more of the data access components 315 may receive a request for a token together with an offset, length, logical unit number, file handle, or the like that identifies data on the store 220.

At block 715, a token is generated. The token generated may represent data that was logically stored (e.g., in the store 220 of FIG. 3). As mentioned previously, this data may be non-changing or allowed to change during the validity of the token depending on implementation. The token may represent a subset of the data requested as indicated previously. For example, referring to FIG. 3, the token manager 320 may generate a token to represent the data requested by the requestor 210 on the store 220.

At block 720, the token is associated with the represented data via a data structure. For example, referring to FIG. 3, the token manager 320 may store an association in the token store 325 that associates the generated token with the represented data.

At block 725, the token is provided to the requestor. For example, referring to FIG. 3, the token manager or one of the data access components 315 may provide the token to the data access components 310 to provide to the requestor 210. The token may be returned with a length that indicates the size of data represented by the token.

At block 730, other actions, if any, may be performed. Note that at block 735, at any time after the token has been generated, the token manager may invalidate the token depending on various factors as described previously. If the token is invalidated during a write operation affecting the data, in one implementation, the write may be allowed to proceed to completion. In another implementation, the write may be aborted, an error may be raised, or other actions may occur.

FIG. 8 is a block diagram that generally represents exemplary actions that may occur when an offload write is received at an offload provider in accordance with various aspects of the subject matter described herein. At block 805, the actions begin.

At block 810, a token is received. The token may be received with data that indicates whether to logically write all or some of the data represented by the token. For example, referring to FIG. 3, one of the data access components 315 may receive a token from one of the data access components 310 of FIG. 3.

At block 815, a determination is made as to whether the token is valid. For example, referring to FIG. 3, the token manager 320 may determine whether the received token is valid by consulting the token store 325. If the token is valid the actions continue at block 820; otherwise, the request may be failed and the actions continue at block 817.

At block 817, the request is failed. For example, referring to FIG. 3, the data access components 315 may indicate that the copy failed.

At block 820, the data requested by the offload copy is identified. For example, referring to FIG. 3, the token manager 320 may consult the token store 325 to obtain a location or other identifier of the data associated with the token. The token may include or be associated with data that indicates an apparatus that hosts the data represented by the token.

At block 825, a logical write of the data represented by the token is performed. For example, referring to FIG. 3, the device 335 may logically write the data represented by the token.

At block 830, other actions, if any, may be performed.

Figure 9:
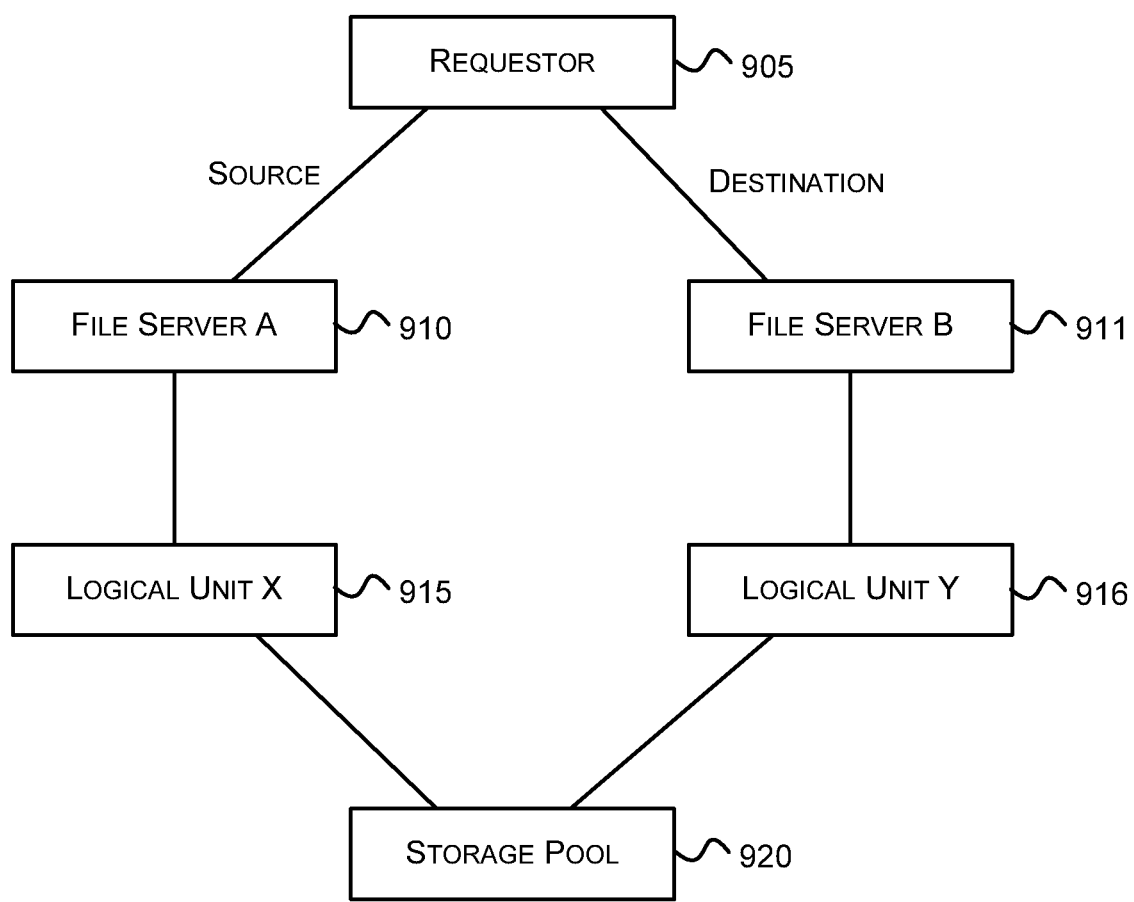
FIGS. 9-14 are block diagrams that represent exemplary environments in which aspects of the subject matter may be incorporated.

FIGS. 9-14 are block diagrams that represent exemplary environments in which aspects of the subject matter may be incorporated. Turning to FIG. 9 illustrated are a requestor 905, file servers 910-911, logical units 915-916, and a storage pool 920.

The requestor 905 is similar to the requestor 210 of FIG. 2 and may be implemented in the same manner as the requestor 210.

The file servers 910-911 are servers that provide access to data on the logical units 915-916, respectively. A file server may have block-level access to the entire logical unit and subdivide the storage of the logical unit into files, which it serves out to clients. The clients may use file-centric APIs, instead of block-storage APIs. The file server translates file IO requests into block storage IO requests, and keeps track of which files exist, where their data is stored, metadata about the files, and the like. A file server may impose security boundaries which may grant access to some files and block access to other files.

A logical unit is a block of storage that is logically contiguous even though the block may be spread across one or more physical storage devices. A logical unit may be thought of as an abstraction of a disk drive. An example of a logical unit includes virtual storage such as a virtual disk.

The storage pool 920 may include any storage devices that are capable of storing data. The storage pool 920 may include an array of one or more such storage devices. These storage devices may be arranged in a SAN, attached to a server (not shown), attached to the file servers 910-911, or be otherwise arranged without departing from the spirit or scope of aspects of the subject matter described herein. As used herein, a storage pool may implement an offload provider.

The requestor 905 may issue an offload read to the file server 910 and obtain a token. Using the token, the requestor 905 may issue an offload write to the file server 911. Using a token manager (not shown), the storage pool 920 may then recognize the token and logically write data represented by the token according to the capabilities of the storage pool 920.

Figure 10:
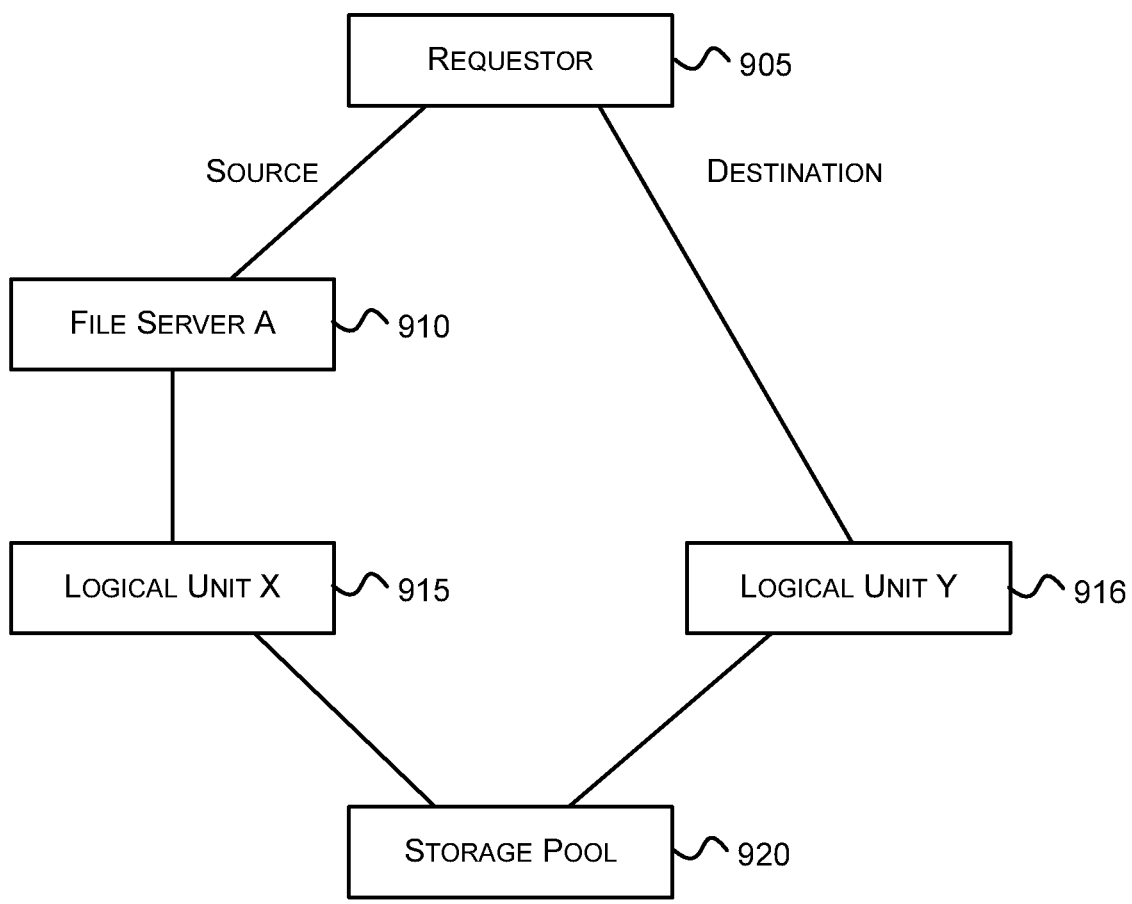

FIG. 10 shows an example where the requestor 905 executes on an apparatus that has mounted the logical unit 916. In this example, the requestor 905 may issue an offload read to the file server 910 and obtain a token. The requestor 905 may then use this token to issue an offload write to the logical unit 916 which is backed by the storage pool 920. The storage pool 920 may then recognize the token and logically write data represented by the token according to the capabilities of the storage pool 920.

Figure 11:
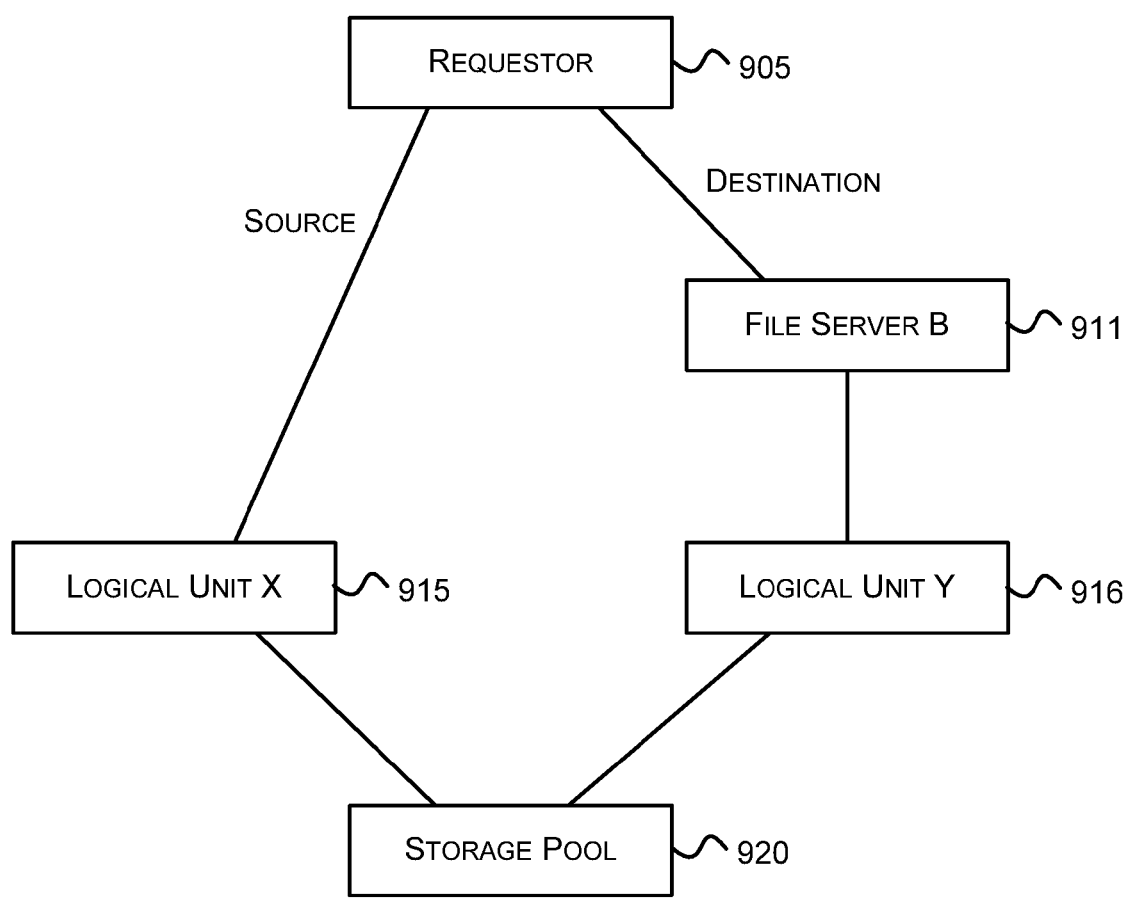

FIG. 11 shows an example where the requestor is on an apparatus that has mounted the logical unit 915. In this example, the requestor 905 may issue an offload read to the logical unit 915 which is backed by the storage pool 920. A token manager (e.g., possibly part of the storage pool 920) may then issue a token to the requestor 905 which the requestor 905 may then use to issue an offload write to the file server 911. The file server 911 may pass this token to the storage pool 920 which may then recognize the token (e.g., via the token manager) and logically write data represented by the token according to the capabilities of the storage pool 920.

Figure 12:
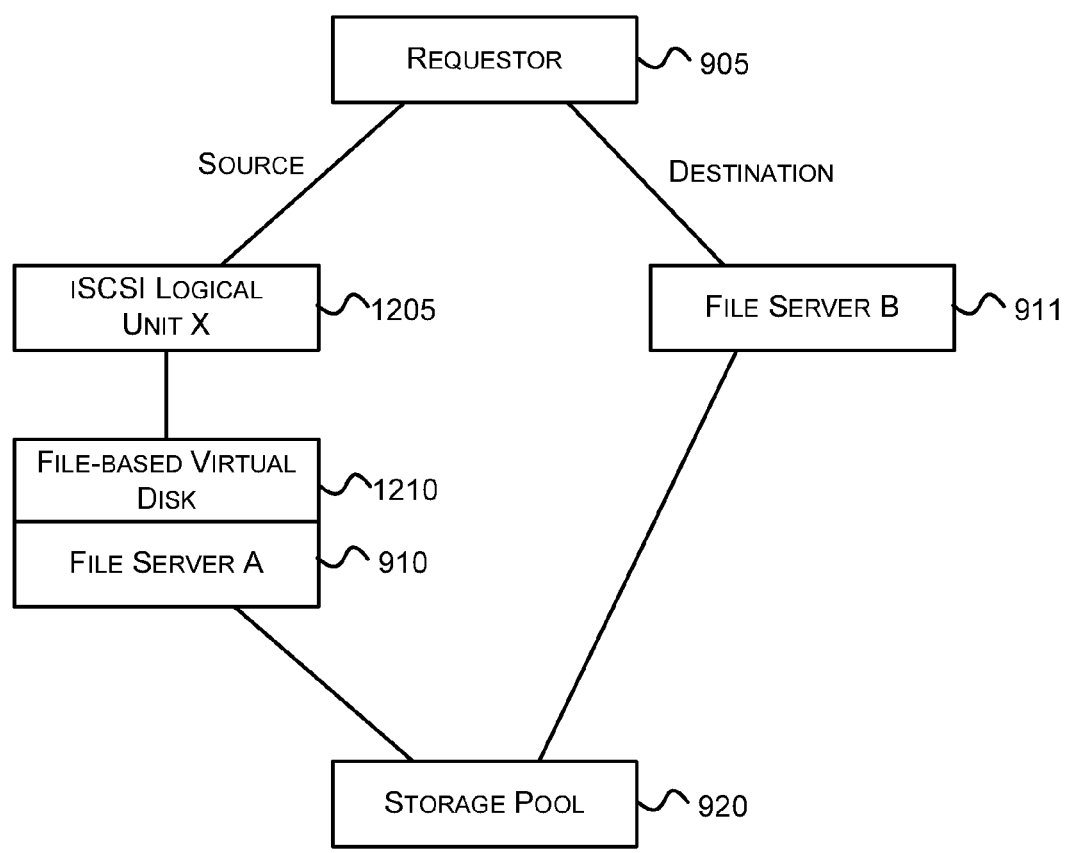

FIG. 12 shows an example in which the source is a file-based virtual disk 1210 that is served over an iSCSI logical unit 1205 from a file server 910 while the destination is a file hosted on a file server 911. The file servers 910-911 have storage in the form of logical units (not shown) provided via the storage pool 920. In this example, the requestor 905 issues an offload read via the iSCSI logical unit 1205. This request may go through the file server 910 to reach a token manager (e.g., possibly part of the storage pool 920). The token manager provides a token that represents the data. This token is passed back to the requestor 905. The requestor 905 may then pass this token in an offload write to the file server 911 which may pass the token to the storage pool 920. The storage pool 920 may then recognize the token (e.g., via the token manager) and logically write data represented by the token according to the capabilities of the storage pool 920.

Figure 13:
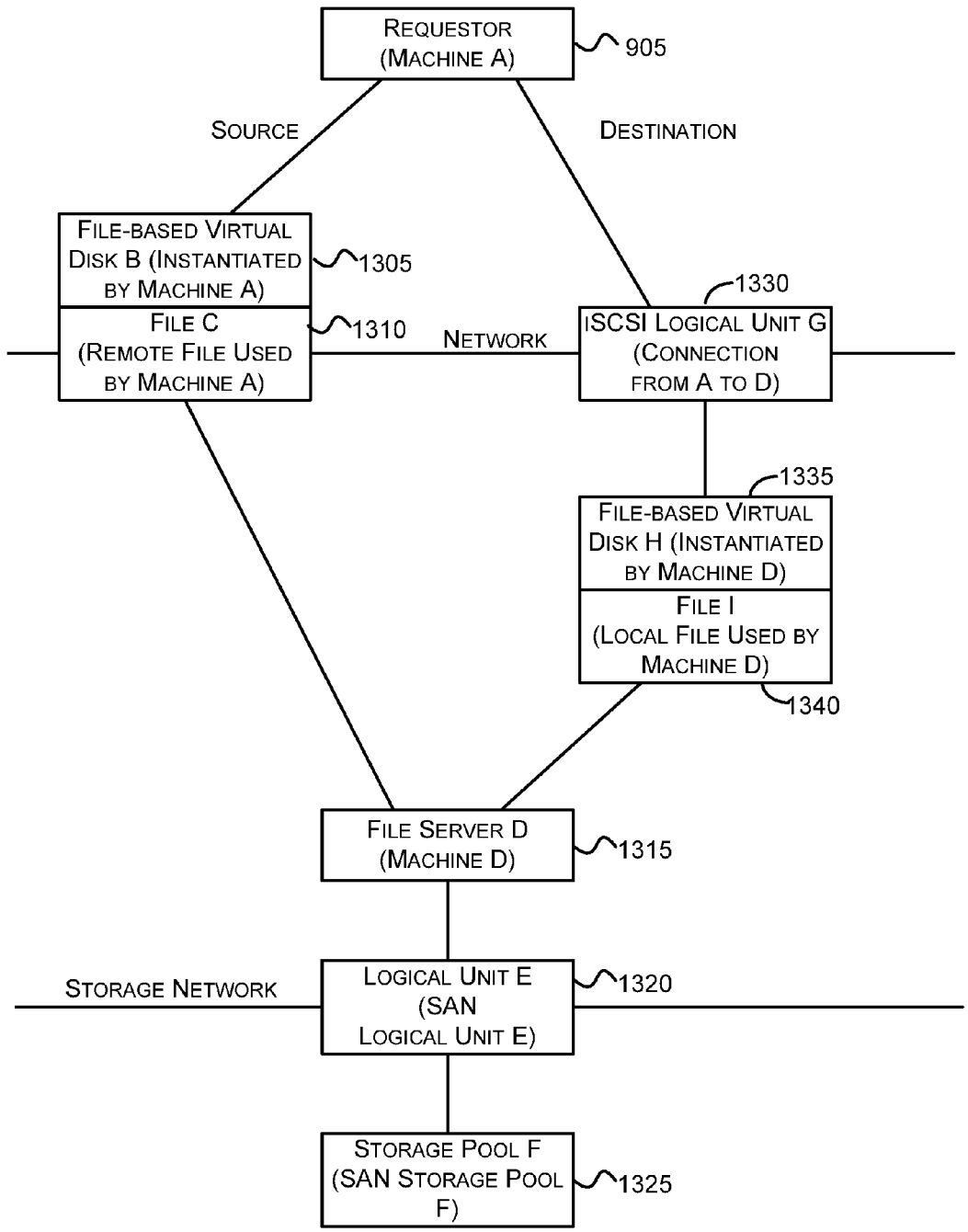

FIG. 13 illustrates an example in which the requestor 905 is hosted on machine A. The source of an offload read is a virtual disk 1305 backed by a file 1310 accessed through a file server 1315 which is in turn backed by logical unit 1320 in storage pool 1325. The destination is an iSCSI logical unit 1330, based on a virtual disk 1335 backed by a file 1340 stored on the file server 1315, in turn backed by the logical unit 1320 in the storage pool 1325. In this example, as in the other examples, a token may be obtained that represents data of the storage pool 1325. This token may then be used to logically write the data.

The source stack may use a file-based network protocol such as SMB, while the destination may use the iSCSI network protocol, which is a block-based protocol. On the source, a file-based virtual disk is instantiated on machine A. On the destination, a file-based virtual disk is instantiated on machine D. Offload reads and writes as described herein may be used to transfer data in this arrangement, in part, because the they do not require that a single command represent the source and destination.

Figure 14:
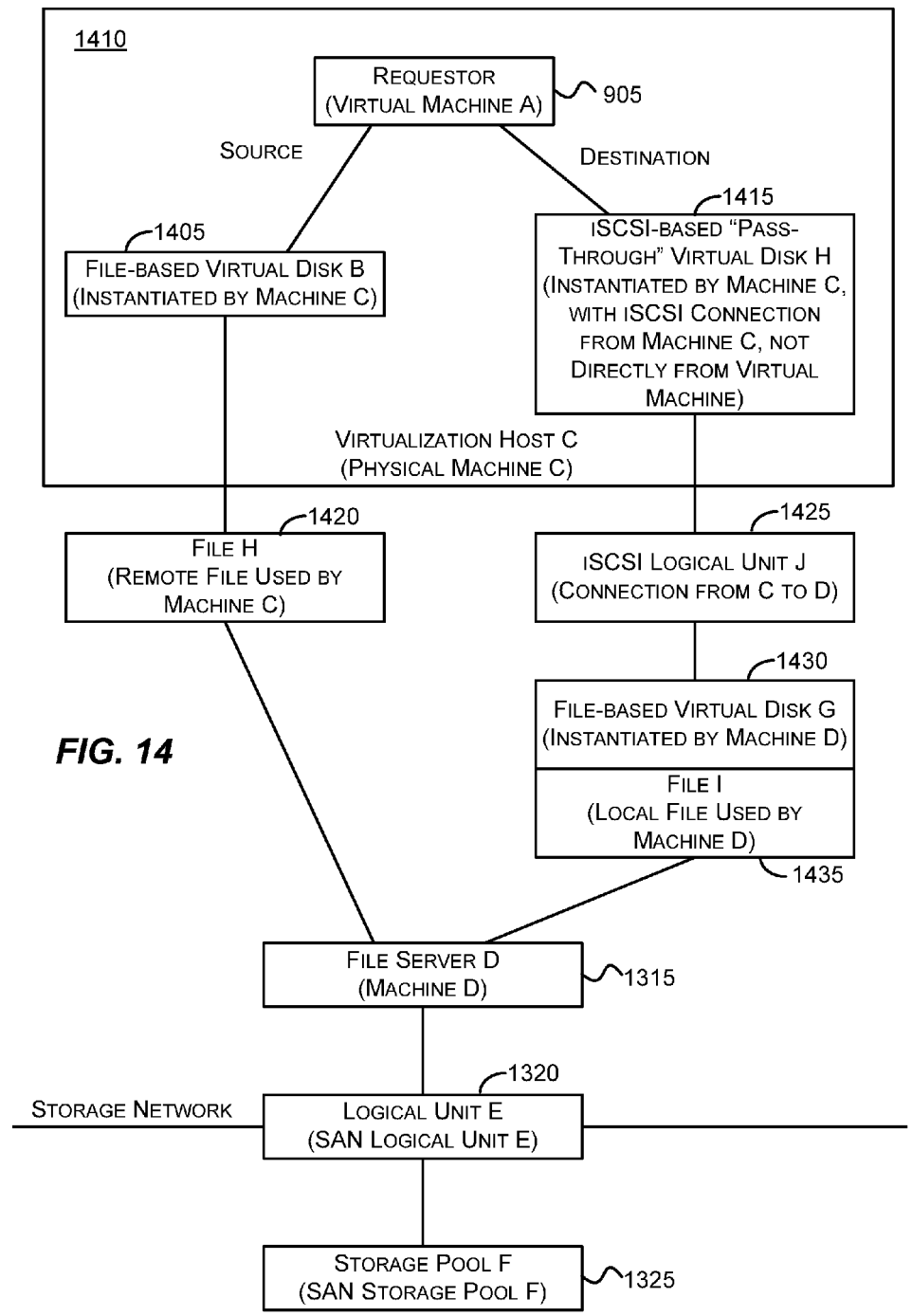

FIG. 14 illustrates an example in which the requestor 905 is hosted in a virtual machine A that is hosted in a virtualization host 1410 of a physical machine C. The source is a virtual disk instantiated by the virtualization host 1410 based on a file 1420 served from file server 1315, with file data stored in an underlying logical unit 1320 in a storage pool 1325. The destination is a virtual disk 1415 backed by an iSCSI logical unit 1425 with a connection from the virtualization host 1410 to the file server 1315, in turn backed by a virtual disk 1430 instantiated by the file server 1315, in turn based on a file 1435 stored in the file system of the file server 1315, the file system in turn stored in the underlying logical unit 1320 in the storage pool 1325. In this example, as in the other examples, a token may be obtained that represents data of the storage pool 1325. This token may then be used to logically write the data.

Although some of the discussion above has referred to logically writing data of a file, aspects of the subject matter described herein may also be applied to transferring data from a logical unit to another logical unit or file or vice versa. For example, data of a file representing a logical unit of a virtual machine may be logically written to a logical unit of a storage device and vice versa.

Previously, it was mentioned that a token manager may associate a token with a location at which data represented by the token may be found. In one embodiment, this information may be embedded in a data structure that is passed with or includes the token. For example, referring to FIG. 3 one or more of the file system components 315 may embed an identifier of the device 335 that hosts the store 220 in a data structure that is passed with or includes the token returned by the token manager 320. This data structure may then be passed in conjunction with the token to the requestor 210.

When the requestor 210 issues an offload write, the requestor 210 may then pass this data structure in conjunction with the token to a destination offload provider. The destination offload provider may then use the identifier included in the data structure to locate the device 335 and obtain the data represented by the token that is to be logically written to the destination store. If a destination offload provider is unable to locate the device 335 based on the data included in the data structure, the destination offload provider may take various actions including, for example, failing the offload write operation, attempting to locate the device 335 based on some other mechanism such as querying known offload providers or obtaining data from a token manager, or some other mechanism.

A token manager may generate a token using already existing identifiers. For example, a storage system may create hashes of data payload stored on the storage system. These hashes may, among other things, serve to identify the data payload on the storage system. To generate a token, the token manager may hash or otherwise combine (e.g., concatenate) the hashes for each data payload block represented by the token. When the token is received in an offload write, the hashes encoded in the token may be used to validate the non-changed status of data payload blocks and copy the data as appropriate.

The storing of this type of token separately by a token manager may be omitted. Instead, the destination may be able to find out whether the data is available (has not changed) using the hashes encoded in the token.

Exemplary Uses

Figure 15:
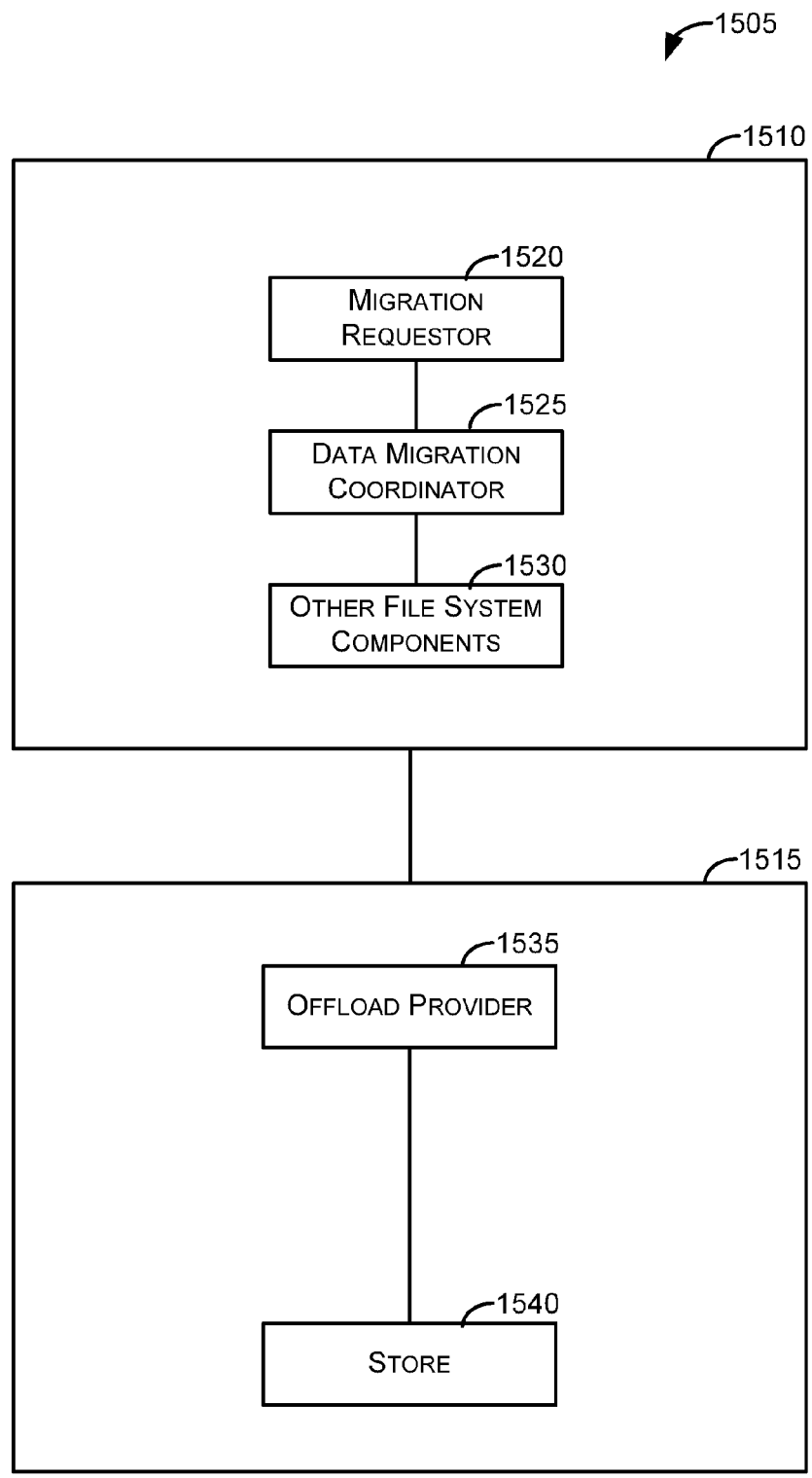
FIG. 15 is a block diagram that generally represents an exemplary arrangement of components of systems in which data is migrated using offload reads and writes in accordance with aspects of the subject matter described herein.

FIG. 15 is a block diagram that generally represents an exemplary arrangement of components of systems in which data is migrated using offload reads and writes in accordance with aspects of the subject matter described herein. As illustrated, the system 1505 includes an apparatus 1510 that hosts the migration requestor 1520 together with a data migration coordinator 1525 and other file system components 1530 as well as an apparatus 1515 that hosts an offload provider 1535 and a store 1540. In another embodiment, the components of the apparatus 1515 may be included on the apparatus 1510 and the apparatus 1515 may be omitted. In another embodiment, the store 1540 may be external to the apparatus 1515 and there may be additional file system components that provide access to the store 1540. In one embodiment, the store 1540 may be distributed over multiple apparatuses (e.g., a source SAN device and a destination SAN device).

The migration requestor 1520 may ask the data migration coordinator 1525 to migrate data from one location to another. For example, the migration requestor 1520 may ask the data migration coordinator 1525 to migrate the data from one logical unit to another. In response, the data migration coordinator 1525 may request and obtain one or more tokens that represent the data at a point in time. The data migration coordinator 1525 may also issue one or more offload writes to the apparatus 1515 to cause the data to be logically written to another logical unit.

Depending on the amount of data written and the capabilities of the offload provider 1540, the offload write may take longer or shorter. During the time that the offload write is happening, the requestor 1520 or another application may make changes to the data. If desired, these changes may also be logically written to the new logical unit. This may occur in various ways.

For example, the data migration coordinator 1525 may logically write the updates. For example, if all requests to modify the data come through the data migration coordinator 1525, the data migration coordinator 1525 may mirror these updates to the new volume. If all requests to modify the data do not come through the data migration coordinator 1525, the data migration coordinator 1525 may be able to compare the source and destination data and update the destination data as appropriate.

The examples above are not intended to be all-inclusive or exhaustive. Based on the teachings herein, those skilled in the art may recognize other actions that may be taken by the data migration coordinator 1525 to logically write updates to the destination logical unit without departing from the spirit or scope of aspects of the subject matter described herein.

Figure 16:
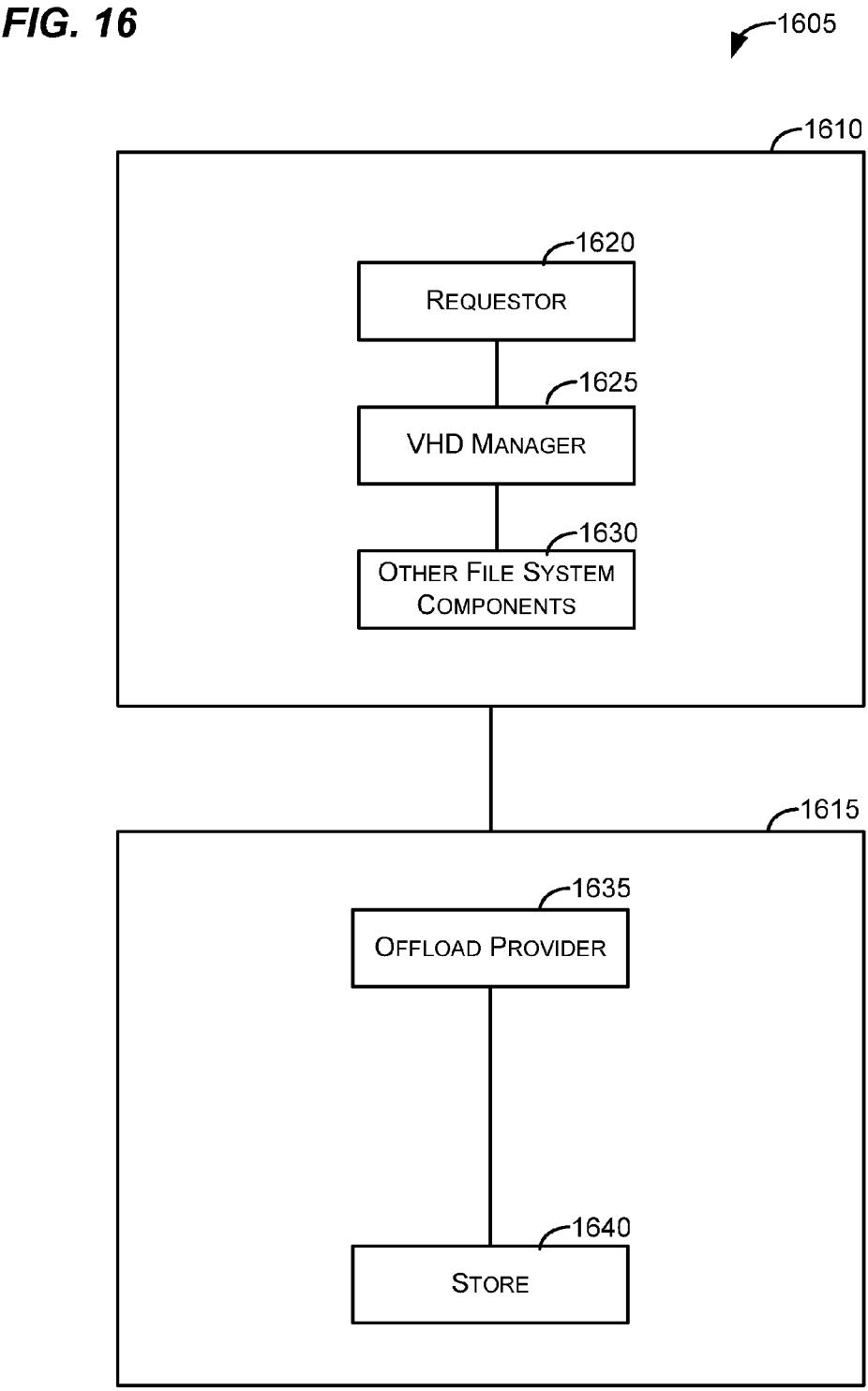
FIG. 16 is a block diagram that generally represents an exemplary arrangement of components of systems in which virtual hard disk data is managed in accordance with aspects of the subject matter described herein.

FIG. 16 is a block diagram that generally represents an exemplary arrangement of components of systems in which virtual hard disk data is managed in accordance with aspects of the subject matter described herein. As illustrated, the system 1605 includes an apparatus that hosts a requestor 1620 together with a virtual hard disk (VHD) manager 1625 and other file system components 1630 as well as an apparatus 1615 that hosts an offload provider 1635 and a store 1640. In another embodiment, the components of the apparatus 1615 may be included on the apparatus 1610 and the apparatus 1615 may be omitted. In another embodiment, the store 1640 may be external to the apparatus 1615 and there may be additional file system components that provide access to the store 1640. In one embodiment, the store 1640 may be distributed over multiple apparatuses (e.g., a source store and a destination store).

In some applications it may be desirable to convert a VHD to a logical unit and vice versa. To do this, the requestor 1620 may specify a source VHD and a destination logical unit and send a request to convert the VHD to the destination logical unit to the VHD manager 1625. In response, the VHD manager 1625 may obtain one or more tokens from the offload provider 1635 that represent virtual disk payload data that is stored on the store 1640. The VHD manager 1625 may then send the one or more tokens in one or more offload writes and specify a destination logical unit on the store 1640. The offload provider 1635 may then logically write the data represented by the one or more tokens to the destination logical unit.

Alternatively, the VHD manager 1625 may obtain one or more tokens that represent the data of a logical unit. Afterwards, the VHD manager 1625 may send the one or more tokens in one or more offload writes and specify a destination file. The offload provider 1635 may then logically write the data from the logical unit into the destination file as part of building the destination file into a valid VHD file. If additional steps are needed to prepare the destination file to receive the data of the logical unit, the VHD manager 1625 may prepare the destination file as appropriate. One exemplary preparation may include writing additional VHD-related data structures to the file such as a block allocation table.

Based on the teachings herein, those skilled in the art will recognize how the above applications may simplify the management of virtual machines and their storage systems while decreasing latency for VHD management operations. For example, through this mechanism, a VHD may be converted to a logical unit before a virtual machine is instantiated. The virtual machine may then use the logical unit directly while it is executing. Afterwards, the logical unit may be converted back to a VHD.

The VHD manager 1625 may also be used to merge diffs of a VHD. In a virtual environment, snapshots of a virtual hard drive may be created. Instead of creating a duplicate copy of the VHD, a snapshot may be performed by recording differences between the current virtual hard drive and the virtual hard drive at the time the snapshot was created. These differences are sometimes referred to as a diff VHD. The VHD representing the virtual hard drive at the time the snapshot was created is sometimes referred to as a 'parent' VHD Sometimes, it is desirable to merge a diff VHD into a parent VHD. To cause this to happen, the requestor 1620 may request that data in the diff VHD be merged with the parent VHD. In response, the VHD manager 1625 may issue offload read(s) and write(s) to merge the data in the diff VHD into the parent VHD.

Sometimes, it is desirable to compact a VHD. To do this, the requestor 1620 may request that the VHD manager 1625 compact a specified VHD. In response, the VHD manager 1625 may issue an offload read of the file to obtain a token representing the data of the VHD. In one embodiment, using the token, the VHD manager 1625 may then issue an offload write to logically write the data represented by the token to a lower offset of the same VHD file. The VHD manager 1625 may then update other data structures in the VHD file to refer to the new location of the data instead of the old location. The VHD manager 1625 may then move other data in the VHD file to lower offsets by repeating the offload read, offload write, and data structure update steps. The VHD manager 1625 may then reduce the end-of-file of the VHD file. The VHD is left with data only below the new reduced end-of-file, as reflected in data structures in the VHD that point to various data of the VHD.

Data on storage media may become more fragmented over time. Some exemplary data that may become fragmented includes files, logical units, volumes, partitions, files, storage spaces, streams, file system metadata, VHD data within a VHD file, other data within other types of files, and the like. As data become fragmented, the data structures referencing the data become more complex, take up more space, become less efficient to query and cache in memory, and/or exhibit other undesirable characteristics. In addition, performance often suffers with fragmentation.

With virtual environments, there may be fragmentation at various levels. For example, the files in a VHD may be fragmented, the extents of the virtual disk within the VHD file may be fragmented, and the VHD (which itself is a file on the underlying file system) may also be fragmented across the underlying file system.

In virtual environments, defragmentation may also be performed at various levels. For example, to defragment a VHD, the requestor 1620 may send a request to the VHD manager 1625 to defragment the virtual disk extents within the VHD file. In response, the VHD manager 1625 may obtain one or more tokens in offload reads and issue offload writes using these one or more tokens to defragment the virtual disk extents in the VHD file.

Defragmenting a virtual storage device may involve one or more repetitions of: obtaining a token that represent data that includes a fragment of the virtual storage device and sending the token together with a request to write the fragment to a location that concatenates (e.g., joins or places next to) the fragment with other fragmented data logically adjacent to the fragment.

In addition, a component (e.g., one of the file system components 1630) in the host of the virtual environment may receive a message from the VHD manager 1625 to defragment the extents of the virtual disk payload data stored in the VHD file. In response, this component may via one or more offload reads obtain one or more tokens that represent extents of the virtual disk payload data stored in the VHD file. The component may then perform offload writes to defragment the virtual disk payload data stored in the VHD file.

The offload provider 1635 may receive the offload writes and may take various actions including, for example, changing mapping tables while not physically defragmenting the data, changing reference counts applicable to stored data, returning success and afterwards defragmenting the data in a low priority process, changing mapping tables and physically defragmenting the data, other actions, and the like. The actions taken by the offload provider 1635 may be opaque to the defragmenting components of the apparatus 1610. As a result, the defragmenting components of the apparatus 1610 may have the illusion of rapidly defragmenting the file or VHD, including the possibility of defragmenting at multiple layers, while physical defragmentation takes place afterwards at a slower rate. Multiple nested layers may be logically defragmented before physical defragmentation is performed, thereby achieving complete physical defragmentation of the nested layers, while using a lower number of physical reads and writes than had the defragmentation been performed physically at each layer using normal reads and writes.

Some file systems may store cyclic redundancy check (CRC) data for a file. This CRC data may be used to validate file contents on a later read of the data of the file. In one embodiment of an implementation of offload write that supports more than one token from a read, for the same range of bytes, a file system may act as a "secondary offload provider". The secondary offload provider may produce a checksum token representing secondary data (e.g., CRC data) corresponding to the main (primary) bulk data. A secondary offload provider recognizes and uses these tokens on the destination stack, but would still send the offload write down the rest of the destination stack, with tokens intact.

In this manner, the secondary offload provider may receive the benefit of the token mechanism while a different offload provider is relied upon to logically write the bulk data. If the secondary offload provider does not recognize a token, it can choose to fail the offload write, or let the offload write proceed down the stack. In this embodiment, more than one token may be used to accomplish the offloaded write of main data plus secondary data (in contrast to having multiple tokens for the primary data and just picking one to use).

In one embodiment, the CRC data may be included in a data structure that includes or is conveyed with a token. This mechanism may also be used to avoid communication between source and destination offload providers where the source and destination offload providers are not the same. For example, in this case, a source offload provider may generate a token and package it with CRC data. Upon receiving the token and CRC data, a destination offload provider may apply the CRC data to the destination data as part of the offload write.

As used herein, the term checksum includes any type of data that may be used to validate other data. CRC data is a type of checksum but checksums are not limited to CRC data. A checksum may be used to verify that data has not become corrupted. A checksum may be simple or complex and may include information to detect different types of errors.

For example, a parity bit may be used to detect parity errors, while a more sophisticated checksum such as a CRC may be used to detect error bursts of several bits. Some error codes such as a message authentication code (MAC), cryptographic hash functions, and some other function may be used to detect other data corruptions that may occur to data.

A checksum may be used in error detection or in error detection and correction. For example, a checksum may include data to detect errors but not to correct the errors. As another example, a checksum may include data to detect and correct certain types of errors.

The examples above are not intended to be all-inclusive or exhaustive of the types of checksums that may be used by aspects of the subject matter described herein. Indeed, based on the teachings herein, those skilled in the art may recognize other checksums that may be used without departing from the spirit or scope of aspects of the subject matter described herein.

A token may be used by more than one offload provider on the destination stack. For example, if the source stack contains one instance of a file system that keeps CRC data, and the destination stack has two instances of the same file system (e.g., in nested fashion due to a VHD), the two instances of the file system on the destination may both use the CRC data passed with a token.

If an offload write fails for any reason, the requestor or another entity may still read the data into memory using the token. Furthermore, an offload read to obtain a token that is then passed to another entity may be an efficient mechanism for transferring data between a source and destination. For example, by sending a token to another entity and allowing the other entity to read the data represented by the token, content such as movies, music, images, or other data-laden content may be passed without the source or destination needing to immediately read and process the data.

Figure 17:
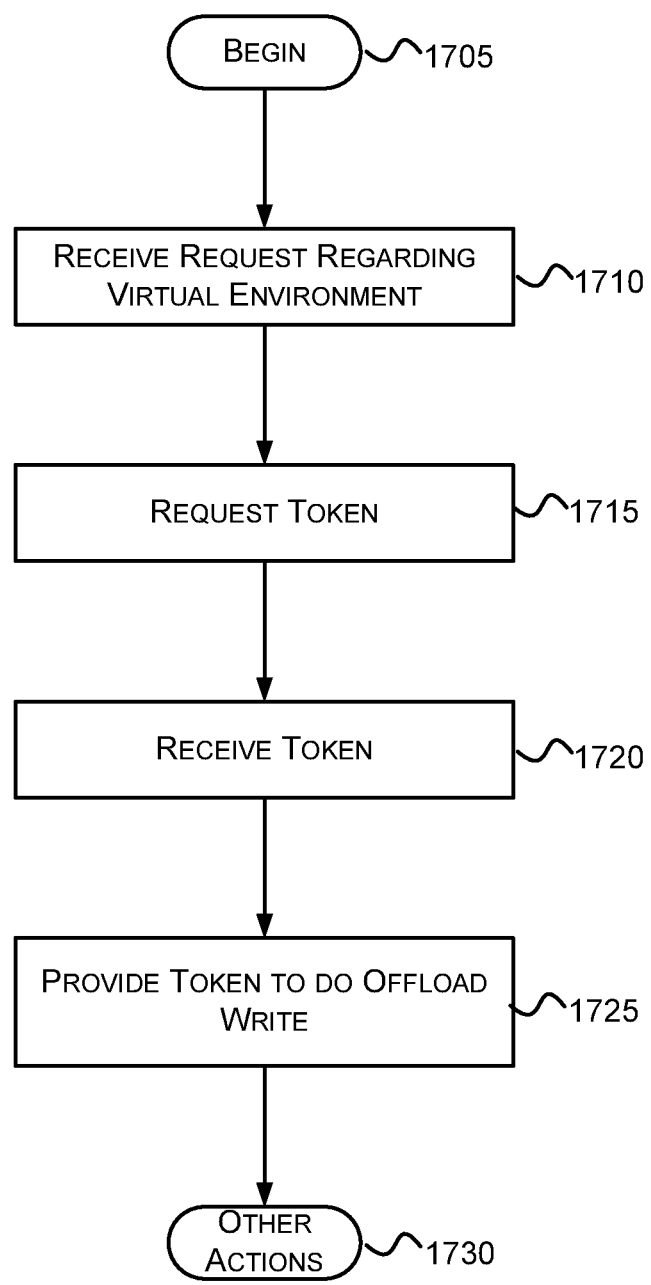
FIGS. 17-18 are flow diagrams that generally represent exemplary actions that may occur in accordance with aspects of the subject matter described herein.
Figure 18:
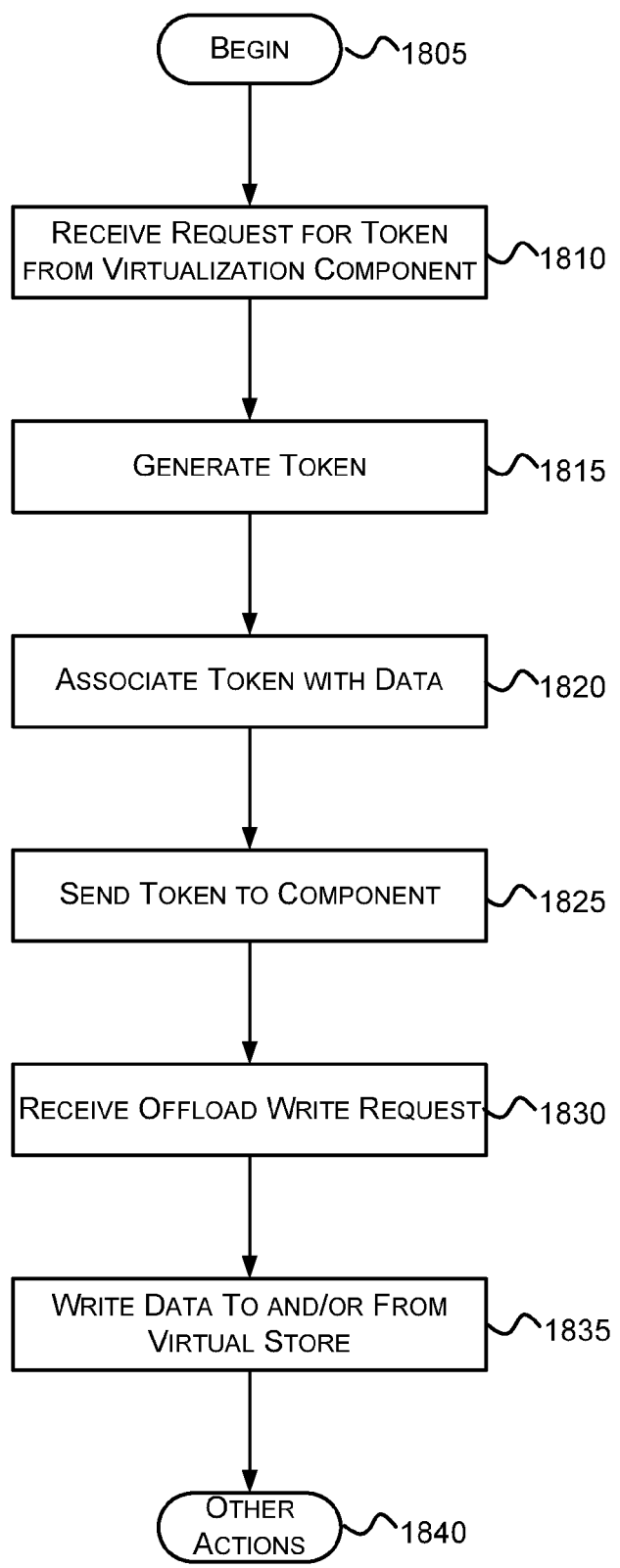

FIGS. 17-18 are flow diagrams that generally represent exemplary actions that may occur in accordance with aspects of the subject matter described herein. For simplicity of explanation, the methodology described in conjunction with FIGS. 17-18 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 17, at block 1705, the actions begin. At block 1710, a request regarding a virtual environment is received. Here, "regarding" means affecting, involving, related to, associated with, or the like. Some examples of requests include requests to copy, move, defragment, compact, swizzle, convert, stripe, de-stripe, mirror, or the like virtual storage. For example, referring to FIG. 16, the VHD manager 1625 may receive a request to write data from a virtual volume of a virtual environment to a physical volume.

Receiving a request regarding a virtual environment may, but does not necessarily mean, that the request comes from within a virtual machine environment. For example, a request to defragment a virtual storage container may come from a component that is outside of a virtual machine environment that uses the virtual storage container. Furthermore, the virtual machine environment may not even be available (e.g., up and running) when a defragment request regarding its virtual storage container is received or while its virtual storage container is actually defragmented.

At block 1715, a token that represents the data is requested. For example, referring to FIG. 16, the VHD manager 1625 sends a request for a token representing the data to be written via the offload provider 1635. The request may be conveyed in conjunction with a description (e.g., an identifier of a virtual volume, a location and length, other information, or the like) that identifies a portion of the store. As before, here and in the claims, the word "portion" may be all or less than all of the store.

At block 1720, a token representing the data is received. The token represents the data as the second data existed when the token was bound to the second data. For example, referring to FIG. 16, the VHD manager 1625 may receive a token that represents data of virtual storage.

At block 1725, the token is provided to an offload provider together with information indicating whether to logically write all or a portion of the second data. For example, referring to FIG. 16, the VHD manager 1625 may provide the token to the offload provider together with an instruction to logically write the data represented by the token (e.g., data in a file representing virtual storage) to physical or virtual storage.

At block 1730, other actions, if any, may be performed.

Turning to FIG. 18, at block 1805, the actions begin. At block 1810, a request from a virtualization component is received. The request is for a representation of data logically stored on a source store. For example, referring to FIG. 16, a request is received from the VHD manager 1625.

At block 1815, a token that represents the data is generated. For example, referring to FIG. 16, the offload provider 1635 may generate a token.

At block 1820, the token is associated with the data via a data structure. For example, referring to FIG. 16, the offload provider 1635 may store an association in a token store that associates the generated token with the represented data.

At block 1825, the token is sent to the virtualization component. For example, referring to FIG. 16, the offload provider 1635 sends the generated token to the VHD manager 1625.

At block 1830, the token is received in conjunction with an offload write request. For example, referring to FIG. 16, the offload provider receives the token with a request to logically write data to the store 1640.

At block 1835, the data is written to and/or from a virtual store of the virtual environment. For example, referring to FIG. 16, the offload provider 1635 may logically write data from, for example, a virtual store to the same virtual store, to another virtual store, to a volume, or from a volume to the same volume, another volume, or the virtual store. The virtual store and/or volume may be included in the store 1640.

At block 1840, other actions, if any, may be performed.

As can be seen from the foregoing detailed description, aspects have been described related to offload reads and writes. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving a first request regarding a virtual environment;
   in response to the first request, sending a second request for a representation of first data of a store, the second request conveyed in conjunction with a description that identifies a portion of the store;
   in response to the second request, receiving a token that represents second data logically stored in the portion of the store, the second data a subset of the first data, wherein the token is invalidated when the second data changes; and
   providing the token together with information indicating to logically write third data via an offload provider, at least one of the first, second, and third data to be retrieved from or stored in a virtual storage container, wherein the information indicating to logically write the third data via an offload provider comprises:
      a destination-relative offset identifying a location to write the third data;
      a token-relative offset identifying a start of the third data; and
      a length identifying the end of the third data.

2. The method of claim 1, wherein receiving a first request comprises receiving a request to logically write data of the virtual storage container to a physical storage and wherein providing the token together with information indicating to logically write third data via an offload provider comprises providing the token to the offload provider and indicating that the offload provider is to logically write the third data to the physical storage.

3. The method of claim 1, wherein sending a second request for a representation of first data of a store comprises sending a second request for a representation of data of one or more of: a physical disk, a virtual disk, a logical unit, a logical disk, a logical disk based on a file, a file representing a logical disk, data representing logical disk differences, a volume, a file, a storage abstraction, and a random access memory.

4. The method of claim 1, wherein receiving a first request comprises receiving a request to logically write data of a logical disk to the virtual storage container and wherein providing the token together with information indicating to logically write third data via an offload provider comprises providing the token to the offload provider and indicating that the offload provider is to logically write data of the logical disk to a file that represents the virtual storage container.

5. The method of claim 1, wherein receiving a first request comprises receiving a request to merge differences of at least two virtual storage containers and wherein sending a second request for a representation of first data of a store comprises sending a request for a token for data representing one or more of the differences.

6. The method of claim 1, wherein sending a second request for a representation of first data of a store comprises sending a request for a representation of data that is in a file accessible via a second computer, the file backed by a third computer that accesses the file from a storage pool external to the third computer.

7. The method of claim 1, wherein receiving a first request comprises receiving a request to defragment the virtual storage container and wherein providing the token together with information indicating to logically write third data via an offload provider comprises sending a plurality of requests to logically write portions of the second data that are fragmented.

8. The method of claim 1, wherein conditions related to invalidation of the token are stored in a token store.

9. A physical storage device having computer-executable instructions, which when executed by at least one processor perform a method comprising:
   receiving, from a virtualization component of a virtual environment, a first request for a representation of first data logically stored in a source store;
   generating a token that represents second data logically stored in the source store, the second data a subset of the first data, wherein the token is invalidated when the second data changes;
   associating the token with the second data via a data structure, the token usable to obtain the second data as the data existed when the token was bound to the second data;
   sending, to the virtualization component, the token; and
      receiving the token in conjunction with a second request to logically write third data, wherein the request is includes information comprising:
      a destination-relative offset identifying a location to write the third data;
      a token-relative offset identifying a start of the third data; and
      a length identifying the end of the third data.

10. The physical storage device of claim 9, wherein receiving a first request for a representation of first data logically stored in a source store comprises receiving a request for representation of data of a file, the file representing a virtual storage container.

11. The physical storage device of claim 10, wherein receiving the token in conjunction with a second request to logically write third data comprises receiving a request to logically write data from the virtual storage container to a logical disk.

12. The physical storage device of claim 9, wherein receiving a first request for a representation of first data logically stored in a source store comprises receiving a request for a representation of data logically stored in a logical disk.

13. The physical storage device of claim 12, wherein receiving the token in conjunction with a second request to logically write third data comprises receiving a request to logically write data from the logical disk to a virtual storage container and further comprising preparing a file representing the virtual storage container by writing a block allocation table to the file.

14. The physical storage device of claim 9, further comprising binding the token to the second data after receiving the first request and before sending the token.

15. The physical storage device of claim 9, wherein receiving the first request comprises receiving the first request via a first path that includes a first machine and wherein receiving the second request comprises receiving the second request via a second path that does not include the first machine.

16. In a computing environment, a system, comprising:
   a virtualization layer operable to create a virtual environment having one or more virtual storage devices;
   a virtual storage manager operable to receive a request to logically write data to or from one or more of the virtual storage devices, the virtual storage manager further operable to send a request for a representation of first data in a store, the virtual storage manager further operable to receive a token that represents second data as the second data logically existed when the token was bound to the second data, wherein the token is invalidated when the second data changes, the virtual storage manager further operable to provide the token together with information indicating to logically write third data, wherein the information indicating to logically write the third comprises:
- a destination-relative offset identifying a location to write the third data;
- a token-relative offset identifying a start of the third data; and
- a length identifying the end of the third data; and an offload provider operable to receive the token together with the information, the offload provider further operable to logically write the third data using the token that represents the second data.

17. The system of claim 16, wherein the virtual storage manager being operable to receive a request to logically write data to or from one or more of the virtual storage devices comprises the virtual storage manager being operable to receive a request to logically write data of one of the virtual storage devices to a logical disk and wherein the offload provider being operable to logically write the third data comprises the offload provider being operable to logically write the third data to the logical disk.

18. The system of claim 16, wherein the virtual storage manager is further operable to update a virtual storage device for the third data by writing offset translation data structures of the virtual storage device.

19. The system of claim 16, wherein the virtual storage manager being operable to receive a request to logically write data to or from one or more of the virtual storage devices comprises the virtual storage manager being operable to receive a request to logically write data of a logical disk to one of the virtual storage devices and wherein the offload provider being operable to logically write the third data comprises the offload provider being operable to logically write the data of the logical disk to the one of the virtual storage devices.

20. The system of claim 16, wherein the virtual storage manager is further operable to receive a request to defragment one of the virtual storage devices, the virtual storage manager being further operable to logically defragment the one of the virtual storage devices by performing actions, comprising:
- obtaining a token that represents data that includes a fragment of the one of the virtual storage devices; and
- sending the token together with a request to write the fragment to a location that concatenates the fragment with other fragmented data logically adjacent to the fragment.

* * * * *